(12) United States Patent
Tomita et al.

(10) Patent No.: US 8,855,402 B2
(45) Date of Patent: Oct. 7, 2014

(54) IMAGE CREATION METHOD, SUBSTRATE INSPECTION METHOD, NON-TRANSITORY RECORDING MEDIUM HAVING PROGRAM RECORDED THEREON FOR EXECUTING IMAGE CREATION METHOD OR SUBSTRATE INSPECTION METHOD, AND SUBSTRATE INSPECTION APPARATUS

(75) Inventors: Hiroshi Tomita, Koshi (JP); Kazuya Hisano, Koshi (JP); Tadashi Nishiyama, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 304 days.

(21) Appl. No.: 13/406,789

(22) Filed: Feb. 28, 2012

(65) Prior Publication Data

US 2012/0237110 A1 Sep. 20, 2012

(30) Foreign Application Priority Data

Mar. 16, 2011 (JP) .................. 2011-058277

(51) Int. Cl.
*G06K 9/00* (2006.01)
*G06T 7/00* (2006.01)
*G06K 9/46* (2006.01)

(52) U.S. Cl.
CPC ..... *G06T 7/0008* (2013.01); *G06T 2207/30141* (2013.01); *G06K 9/4609* (2013.01)
USPC ........................................................ 382/149

(58) Field of Classification Search
None
See application file for complete search history.

(56) References Cited

U.S. PATENT DOCUMENTS

| 5,233,670 | A * | 8/1993 | Dufour et al. ................. 382/197 |
| 6,980,691 | B2 * | 12/2005 | Nesterov et al. .............. 382/165 |
| 7,483,040 | B2 * | 1/2009 | Michel .......................... 345/606 |
| 7,689,055 | B2 * | 3/2010 | Zhang et al. .................. 382/254 |
| 7,812,868 | B2 * | 10/2010 | Ikeda ............................ 348/252 |
| 2001/0012390 | A1 * | 8/2001 | Watanabe ..................... 382/144 |
| 2007/0188832 | A1 | 8/2007 | Hayakawa et al. |
| 2013/0221104 | A1 * | 8/2013 | Wang ....................... 235/462.25 |

FOREIGN PATENT DOCUMENTS

| JP | 2001091473 A | 4/2001 |
| JP | 2004-108845 A | 4/2004 |
| JP | 2007240519 A | 9/2007 |
| JP | 2010019561 A | 1/2010 |

\* cited by examiner

*Primary Examiner* — Vikkram Bali
(74) *Attorney, Agent, or Firm* — Posz Law Group, PLC

(57) ABSTRACT

An image creation method of creating a filter image for removing a pseudo defect to inspect presence/absence of a defect on a substrate includes a filter image creation step of creating the filter image by replacing a picture element value of any one of picture elements located on a circumference of a circle about a center position of a registered image with a maximum value of picture element values of a plurality of picture elements selected from among the picture elements located on the circumference.

12 Claims, 17 Drawing Sheets

THRESHOLD VALUE SMALL (COMPARATIVE EXAMPLE 1)

THRESHOLD VALUE LARGE (COMPARATIVE EXAMPLE 2)

FILTER IMAGE USED (EXAMPLE)

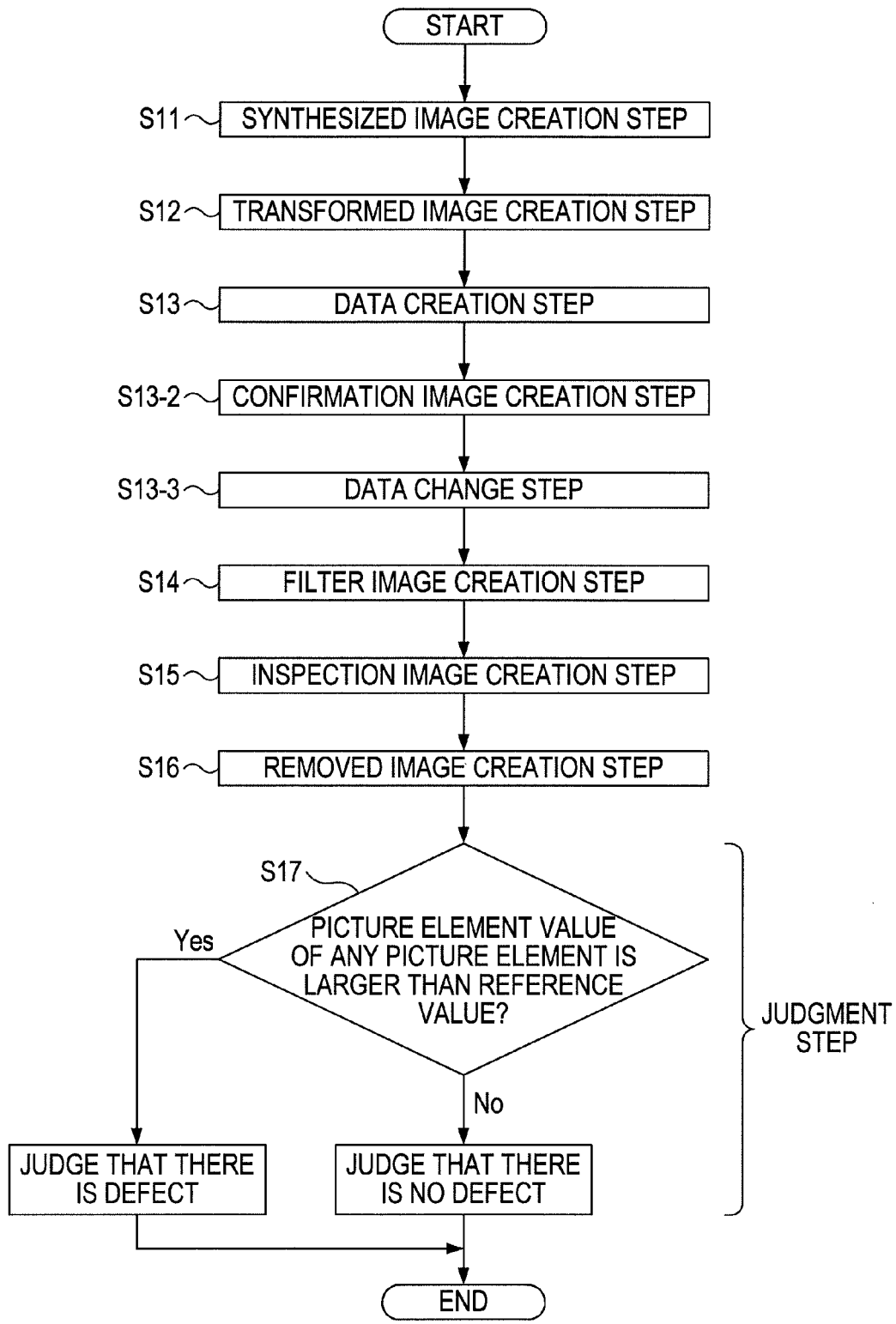

IMAGE CREATION METHOD, SUBSTRATE INSPECTION METHOD, NON-TRANSITORY RECORDING MEDIUM HAVING PROGRAM RECORDED THEREON FOR EXECUTING IMAGE CREATION METHOD OR SUBSTRATE INSPECTION METHOD, AND SUBSTRATE INSPECTION APPARATUS

BACKGROUND OF THE INVENTION

1. Field of the Invention

The present invention relates to an image creation method, a substrate inspection method, a recording medium having a program recorded thereon for executing the image creation method or the substrate inspection method, and a substrate inspection apparatus.

2. Description of the Related Art

In a photolithography step in a manufacturing process for a semiconductor device, for example, steps of a resist coating treatment of forming a resist film on the surface of a substrate such as a wafer, exposure processing of applying and exposing a pattern on the surface of the substrate, a developing treatment of developing the substrate after exposure and so on are performed. The substrate undergone any one of the steps is subjected to a so-called macro defect inspection for whether or not a predetermined resist film is formed on the surface of the substrate, or whether or not appropriate exposure processing is performed, and further whether or not there is a flaw, an adhered foreign substance, by a substrate inspection apparatus.

The macro defect inspection is performed such that an imaging device, for example, a CCD line sensor moves relative to a mounting table mounting the substrate thereon, to capture an image of the relatively moving substrate, and performs image processing on the image to judge the presence or absence of the defect (see, for example, Japanese Laid-open Patent Publication No. 2007-240519, Japanese Laid-open Patent Publication No. 2001-91473, and Japanese Laid-open Patent Publication No. 2010-19561). In particular, the inspection can be performed by the procedure of digitally processing the image taken by the imaging device by, for example, a computer or the like, taking a difference between pixel values of corresponding picture elements in the digitally processed image data and image data of a reference image, and judging a location where the absolute value of the difference exceeds a fixed threshold value as being abnormal.

SUMMARY OF THE INVENTION

However, the substrate inspection method for performing the macro defect inspection on the substrate has the following problems.

Assuming that defects detected by the substrate inspection apparatus are defect candidates, the defect candidates contain real defects causing a problem in manufacture of a semiconductor and pseudo defects causing no problem in manufacture of a semiconductor. Therefore, it is important in practical use to distinguish the pseudo defects from the real defects after the substrate inspection apparatus detects the defects.

For example, when concentric mottles exist on the substrate, the mottles may be detected in error as real defects even though the mottles are not real defects but pseudo defects. It is desirable in actual operation of the substrate inspection to reduce the number of pseudo defects detected in error as described above.

In order to reduce the number of pseudo defects detected in error, it seems only necessary to set a relatively large threshold value. However, for example, in the case that the threshold value is the same within the entire substrate surface, if a relatively large threshold value is set, real defects which are supposed to be detected cannot be detected. Further, since the state of the mottle varies in each substrate, it is difficult to appropriately set the threshold value also taking the variation in the state of the mottle into consideration.

The present invention is made in consideration of the above points, and provides a substrate inspection method and an image creation method of a filter image for substrate inspection therefor which can reduce the number of pseudo defects detected in error and detect real defects which are supposed to be detected without decreasing the sensitivity of detecting defects.

In order to solve the above problems, the present invention is characterized by devising the means described below.

The present invention is an image creation method of creating a filter image for removing a pseudo defect to inspect presence/absence of a defect on a substrate, the method including a filter image creation step of creating the filter image by replacing a picture element value of any one of picture elements located on a circumference of a circle about a center position of a registered image with a maximum value of picture element values of a plurality of picture elements selected from among the picture elements located on the circumference.

Further, the present invention in another aspect is a substrate inspection method of inspecting presence/absence of a defect on a substrate, the method including: a removed image creation step of creating a removed image by subtracting a filter image created by an image creation method of creating a filter image for removing a pseudo defect to inspect presence/absence of a defect on a substrate, from an inspection image created based on an image obtained by imaging a substrate; and a judgment step of comparing picture element values of picture elements in the created removed image to a reference value, and judging that there is a defect on the substrate when the picture element value of any one of the picture elements is larger than the reference value, wherein the image creation method includes a filter image creation step of creating the filter image by replacing a picture element value of any one of picture elements located on a circumference of a circle about a center position of a registered image with a maximum value of picture element values of a plurality of picture elements selected from among the picture elements located on the circumference.

Further, the present invention in another aspect is a non-transitory computer-readable recording medium having a program recorded thereon for causing a computer to perform an image creation method of creating a filter image for removing a pseudo defect to inspect presence/absence of a defect on a substrate, the image creation method including a filter image creation step of creating the filter image by replacing a picture element value of any one of picture elements located on a circumference of a circle about a center position of a registered image with a maximum value of picture element values of a plurality of picture elements selected from among the picture elements located on the circumference.

Further, the present invention in another aspect is a non-transitory computer-readable recording medium having a program recorded thereon for causing a computer to perform a substrate inspection method of inspecting presence/absence of a defect on a substrate, the substrate inspection method including: a removed image creation step of creating a removed image by subtracting a filter image created by an image creation method of creating a filter image for removing a pseudo defect to inspect presence/absence of a defect on a substrate, from an inspection image created based on an image obtained by imaging a substrate; and a judgment step of comparing picture element values of picture elements in the created removed image to a reference value, and judging that there is a defect on the substrate when the picture element value of any one of the picture elements is larger than the reference value, wherein the image creation method includes a filter image creation step of creating the filter image by replacing a picture element value of any one of picture elements located on a circumference of a circle about a center position of a registered image with a maximum value of picture element values of a plurality of picture elements selected from among the picture elements located on the circumference.

Further, the present invention in another aspect is a substrate inspection apparatus for inspecting presence/absence of a defect on a substrate, the apparatus including: an image data obtaining part for imaging a substrate and obtaining image data to inspect presence/absence of a defect on the substrate; a filter image creating part for registering the obtained image data, and creating a filter image for removing a pseudo defect by replacing a picture element value of any one of picture elements located on a circumference of a circle about a center position of the image of the registered image data with a maximum value of picture element values of a plurality of picture elements selected from among the picture elements located on the circumference; a data creating part for performing polar coordinate transformation on position coordinates of picture elements in the image, and creating maximum value data indicating a relation between a radius of the circle about the center position of the image and a maximum value of picture element values of all of the picture elements located on the circumference of the circle; and a display part for displaying the filter image and the maximum value data created by the filter image creating part and the data creating part.

According to the present invention, it is possible in substrate inspection to reduce the number of pseudo defects detected in error and detect real defects which are supposed to be detected without decreasing the sensitivity of detecting defects.

BRIEF DESCRIPTION OF THE DRAWINGS

FIG. 16 is a flowchart illustrating the procedure of respective steps in the substrate inspection method and the image creation method of a filter image for substrate inspection therefor according to a modification example of the first embodiment;

DETAILED DESCRIPTION OF THE INVENTION

To begin with, a substrate inspection method and an image creation method of a filter image for substrate inspection therefor according to a first embodiment of the present invention will be described referring to FIG. 1 to FIG. 15.

Further, a case where a substrate processing apparatus including a substrate inspection apparatus for performing the substrate inspection method according to this embodiment is applied to a coating and developing apparatus will be exemplified in the following.

First, a resist pattern forming apparatus in which an exposure apparatus is connected to the coating and developing apparatus will be briefly described referring to FIG. 1 to FIG. 4.

Figure 1:
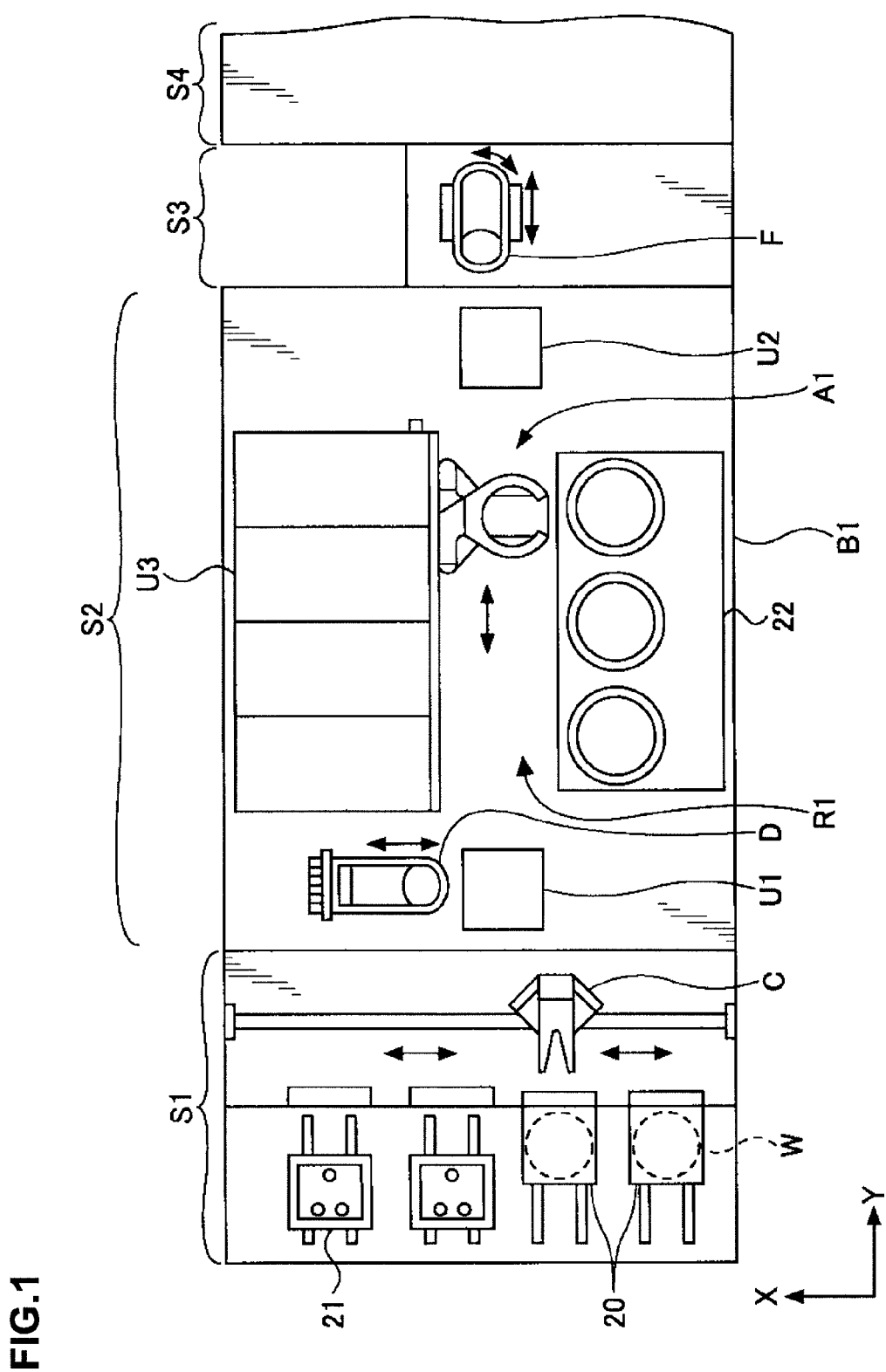
FIG. 1 is a plan view illustrating the configuration of a resist pattern forming apparatus according to this embodiment.
Figure 2:
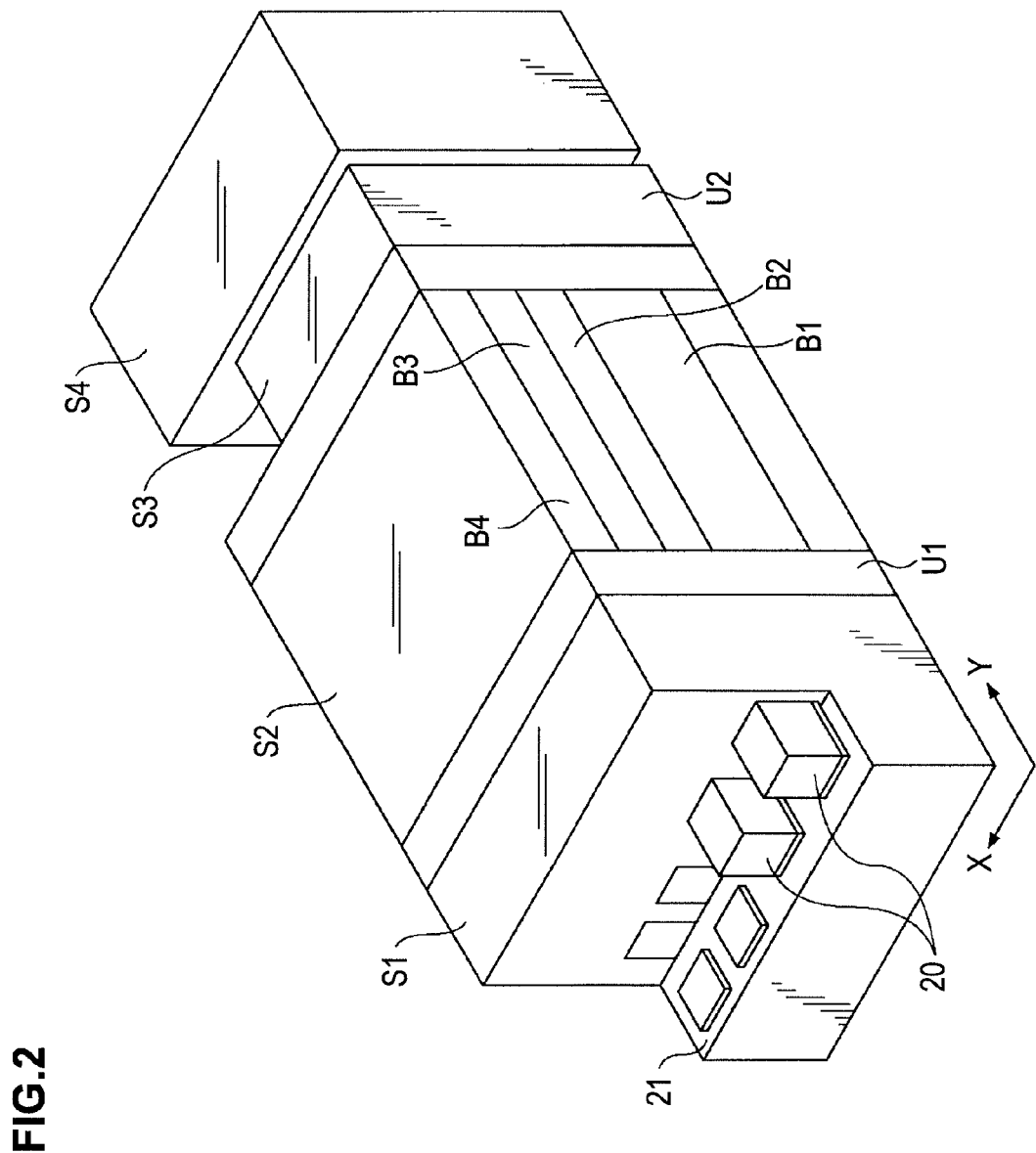
FIG. 2 is a schematic perspective view illustrating the configuration of the resist pattern forming apparatus according to this embodiment.
Figure 3:
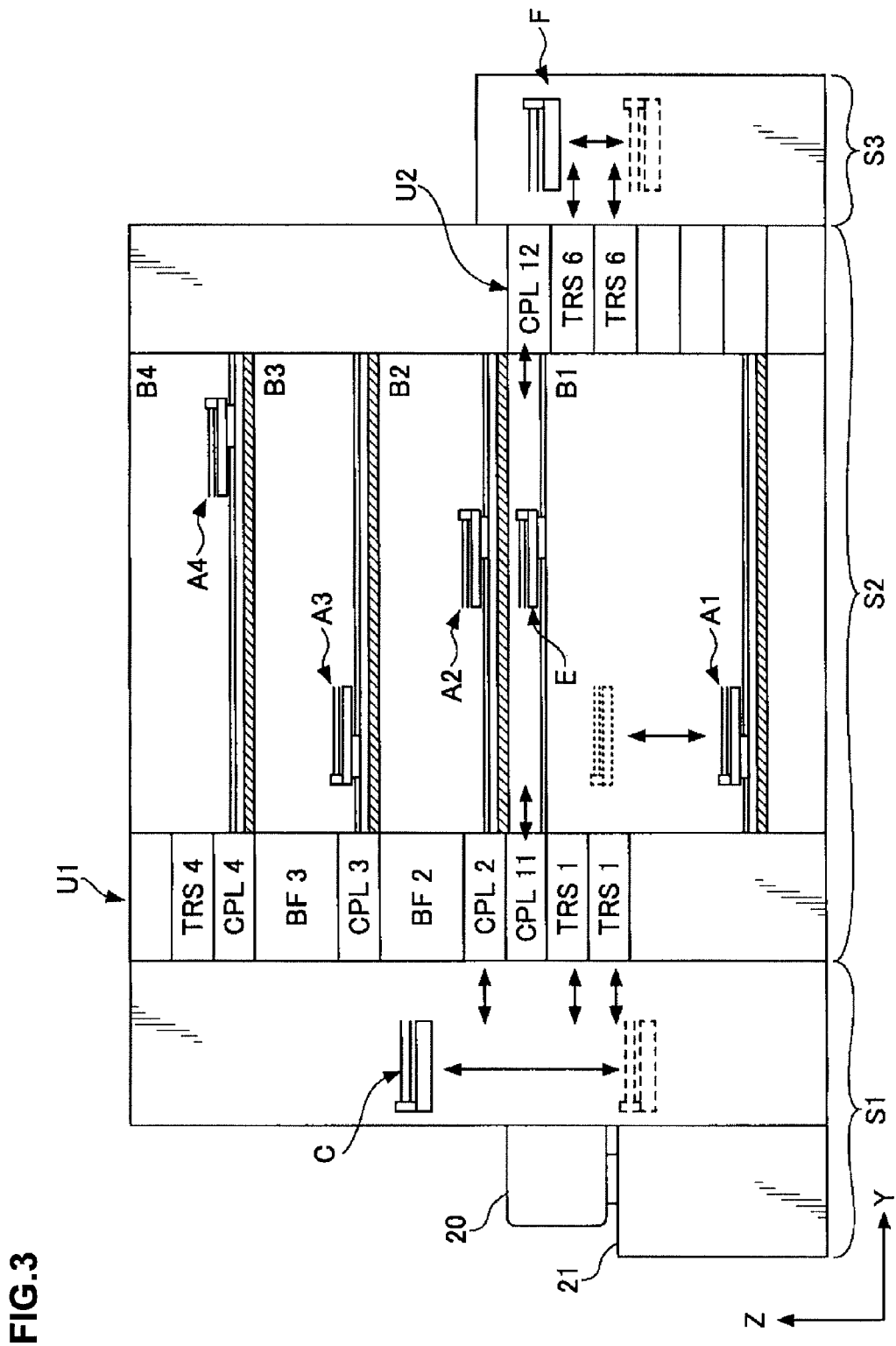
FIG. 3 is a side view illustrating the configuration of the resist pattern forming apparatus according to this embodiment.
Figure 4:
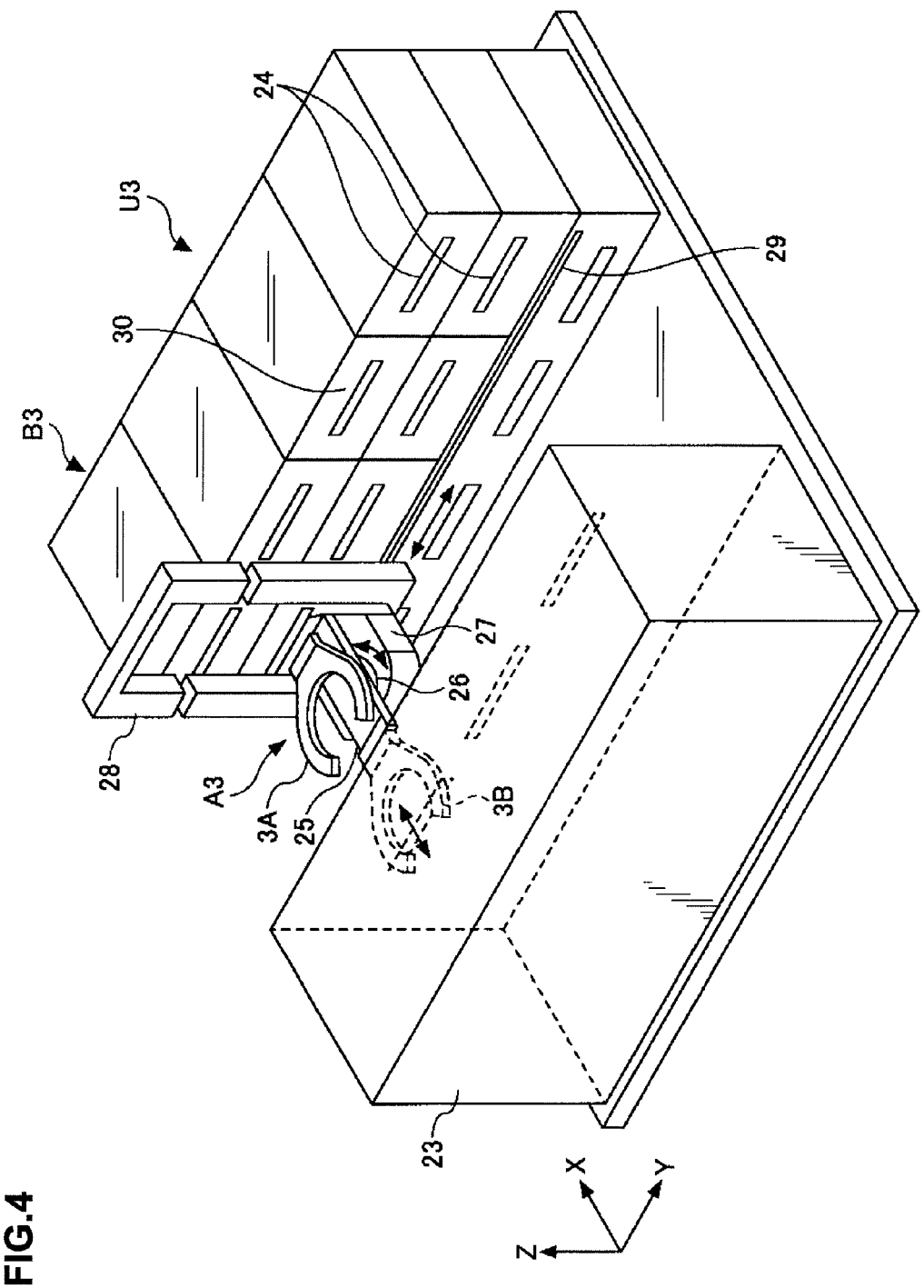
FIG. 4 is a perspective view illustrating the configuration of a third block.

FIG. 1 is a plan view illustrating the configuration of the resist pattern forming apparatus according to this embodiment. FIG. 2 is a schematic perspective view illustrating the configuration of the resist pattern forming apparatus according to this embodiment. FIG. 3 is a side view illustrating the configuration of the resist pattern forming apparatus according to this embodiment. FIG. 4 is a perspective view illustrating the configuration of a later-described third block (COT layer) B3.

The resist pattern forming apparatus has a carrier block S1, a processing block S2, and an interface block S3 as illustrated in FIG. 1 and FIG. 2. Further, an exposure apparatus S4 is provided on the interface block S3 side in the resist pattern forming apparatus. The processing block S2 is provided to be adjacent to the carrier block S1. The interface block S3 is provided to be adjacent to the processing block S2, on the opposite side to the carrier block S1 side of the processing block S2. The exposure apparatus S4 is provided to be adjacent to the interface block S3, on the opposite side to the processing block S2 side of the interface block S3.

The carrier block S1 has carriers 20, mounting tables 21 and a delivery means C. The carrier 20 is mounted on the mounting table 21. The delivery means C is for taking a wafer W out of the carrier 20, delivering the wafer W to the processing block S2, receiving the processed wafer W processed in the processing block S2, and returning the processed wafer W to the carrier 20.

The processing block S2 has a shelf unit U1, a shelf unit U2, a first block (DEV layer) B1, a second block (BCT layer) B2, a third block (COT) B3, and a fourth block (TCT layer) B4 as illustrated in FIG. 2. The first block (DEV layer) B1 is for performing developing treatment. The second block (BCT layer) B2 is for performing treatment of forming an anti-reflection film formed on the lower layer side of a resist film. The third block (COT layer) B3 is for performing coating treatment of a resist solution. The fourth block (TCT layer) B4 is for performing treatment of forming an anti-reflection film formed on the upper layer side of the resist film.

The shelf unit U1 is constituted by stacking various modules. The shelf unit U1 has, for example, delivery modules TRS1, TRS2, CPL11, CPL2, BF2, CPL3, BF3, CPL4, TRS4 stacked in order from the bottom as illustrated in FIG. 3. Further, as illustrated in FIG. 1, a delivery arm D which is movable up and down is provided near the shelf unit U1. Between the modules in the shelf unit U1, the wafer W is transferred by the transfer arm D.

The shelf unit U2 is constituted by stacking various processing modules. The shelf unit U2 has, for example, delivery modules TRS6, TRS6, CPL 12 stacked in order from the bottom as illustrated in FIG. 3.

Note that, in FIG. 3, the delivery modules attached with CPL also serve as cooling modules for temperature regulation, and the delivery modules attached with BF also serve as buffer modules capable of mounting a plurality of wafers W therein.

The first block (DEV layer) B1 has developing modules 22, a transfer arm A1, and a shuttle arm E as illustrated in FIG. 1 and FIG. 3. The developing modules 22 are two-tiered in one first block (DEV layer) B1. The transfer arm A1 is for transferring the wafer W to the developing modules 22 at the two tiers. In short, the transfer arm A1 is in common use as transfer arms for transferring the wafers W to the developing modules 22 at the two tiers. The shuttle arm E is for directly transferring the wafer W from the delivery module CPL11 in the shelf unit U1 to the delivery module CPL12 in the shelf unit U2.

The second block (BCT layer) B2, the third block (COT layer) B3, and the fourth block (TCT layer) B4 have coating modules, processing module groups of a heating and cooling system, and the transfer arms A2, A3, A4. The processing module groups are for performing pre-processing and post-processing for the treatment performed in the coating modules. The transfer arms A2, A3, A4 are provided between the coating modules and the processing module groups and transfer the wafer W between the coating modules and processing modules in the processing module groups.

The blocks of the second block (BCT layer) B2 to the fourth block (TCT layer) B4 have the same configuration except that the chemical in the second block (BCT layer) B2 and the fourth block (TCT layer) B4 is a chemical for anti-reflection film whereas the chemical in the third block (COT layer) B3 is a resist solution.

The configuration of the third block (COT) B3 will be described here as a representative of the second block (BCT layer) B2, the third block (COT layer) B3, and the fourth block (TCT layer) B4.

The third block (COT layer) B3 has a coating module 23, a shelf unit U3, and the transfer arm A3. The shelf unit U3 has a plurality of processing modules stacked to constitute a thermal processing module group, such as heating modules, cooling modules and so on. The shelf unit U3 is arranged to face the coating module 23. Further, in the shelf unit U3, a later-described substrate inspection apparatus 30 is provided to be adjacent to any one of the plurality of processing modules.

The transfer arm A3 is provided between the coating module 23 and the shelf unit U3. A numeral 24 in FIG. 4 denotes a transfer port for delivering the wafer W between each of the processing modules and the transfer arm A3.

The transfer arm A3 has two forks 3 (3A, 3B), a base 25, a rotation mechanism 26, and a lift table 27.

The two forks 3A, 3B are provided to superposed one above the other. The base 25 is provided to be rotatable around the vertical axis by means of the rotation mechanism 26. Further, the forks 3A, 3B are provided to freely move back and forth from the base 25, for example, with respect to a later-described mounting table 32 of the substrate inspection apparatus 30 by means of a not-illustrated forward/backward mechanism.

The lift table 27 is provided on the lower side of the rotation mechanism 26 as illustrated in FIG. 4. The lift table 27 is provided to freely rise and lower, by means of a raising and lowering mechanism, along a not-illustrated Z-axis guide rail linearly extending in the vertical direction (in a Z-axis direction in FIG. 4). As the raising and lowering mechanism, a well-known structure such as a ball screw mechanism or a mechanism using a timing belt can be used. In this embodiment, the Z-axis guide rail and the raising and lowering mechanism are separately covered with a cover body 28 and connected, for example, on the upper side into one unit. Further, the cover body 28 is configured to move sliding along a Y-axis guide rail 29 linearly extending in a Y-axis direction.

The interface block S3 has an interface arm F as illustrated in FIG. 1. The interface arm F is provided near the shelf unit U2 in the processing block S2. Between the processing modules in the shelf unit U2 and between the processing modules and the exposure apparatus S4, the wafer W is transferred by the interface arm F.

The wafers W from the carrier block S1 are successively transferred by the delivery means C into one delivery module in the shelf unit U1, for example, the delivery module CPL2 corresponding to the second block (BCT layer) B2. The wafer W transferred to the delivery module CPL2 is delivered to the transfer arm A2 in the second block (BCT layer) B2 and transferred via the transfer arm A2 to each processing module (the coating module and each of the processing modules in the processing module group of the heating and cooling system), and subjected to processing in each processing module. Thus, an anti-reflection film is formed on the wafer W.

The wafer W on which the anti-reflection film is formed is delivered to the transfer arm A3 in the third block (COT layer) B3 via the transfer arm A2, the delivery module BF2 in the shelf unit U1, the delivery arm D, and the delivery module CPL3 in the shelf unit U1. The wafer W is then transferred to each processing module (the coating module and each of the processing modules in the processing module group of the heating and cooling system) via the transfer arm A3, and subjected to processing in each processing module. Thus, a resist film is formed on the wafer W.

The wafer W on which the resist film is formed is delivered to the delivery module BF3 in the shelf unit U1 via the transfer arm A3.

Note that the wafer W on which the resist film is formed may be transferred to the substrate inspection apparatus 30 in which the front surface of the wafer W has its image taken and is subjected to substrate inspection as will be described later.

Further, the wafer W on which the resist film is formed is further subjected to formation of an anti-reflection film in some cases in the fourth block (TCT layer) B4. In this case, the wafer W is delivered to the transfer arm A4 in the fourth block (TCT layer) B4 via the delivery module CPL4, transferred to each processing module (the coating module and each of the processing modules in the processing module group of the heating and cooling system) via the transfer arm A4, and subjected to processing in each processing module. Thus, an anti-reflection film is formed on the wafer W. The wafer W on which the anti-reflection film is formed is then delivered to the delivery module TRS4 in the shelf unit U1 via the transfer arm A4.

The wafer W on the resist film is formed or the wafer W on which the anti-reflection film is further formed on the resist film thereon is delivered to the delivery module CPL11 via the delivery arm D, and the delivery modules BF3, TRS4. The wafer W delivered to the delivery module CPL11 is directly transferred to the delivery module CPL12 in the shelf unit U2 by the shuttle arm E, and then delivered to the interface arm F in the interface block S3.

The wafer W delivered to the interface arm F is transferred to the exposure apparatus S4 and subjected to predetermined exposure processing. The wafer W subjected to the predetermined exposure processing is mounted on the delivery module TRS6 in the shelf unit U2 via the interface arm F, and returned to the processing block S2. The wafer W returned to the processing block S2 is subjected to developing treatment in the first block (DEV layer) B1. The wafer W subjected to the developing treatment is returned to the carrier 20 via the transfer arm A1, any one of the delivery modules in the shelf unit U1, and the delivery means C.

Figure 5:
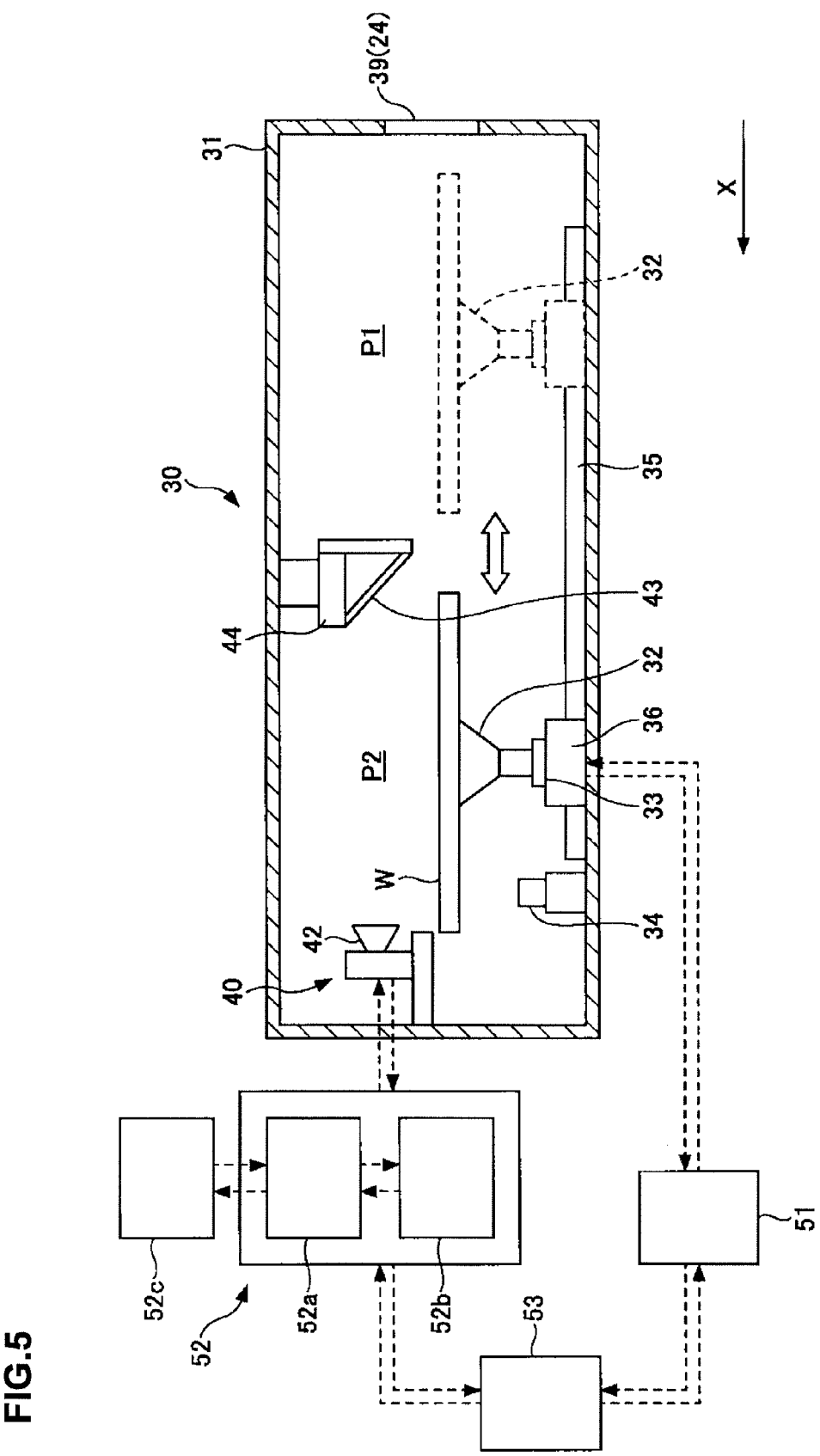
FIG. 5 is a side view including a partial section of a substrate inspection apparatus.
Figure 6:
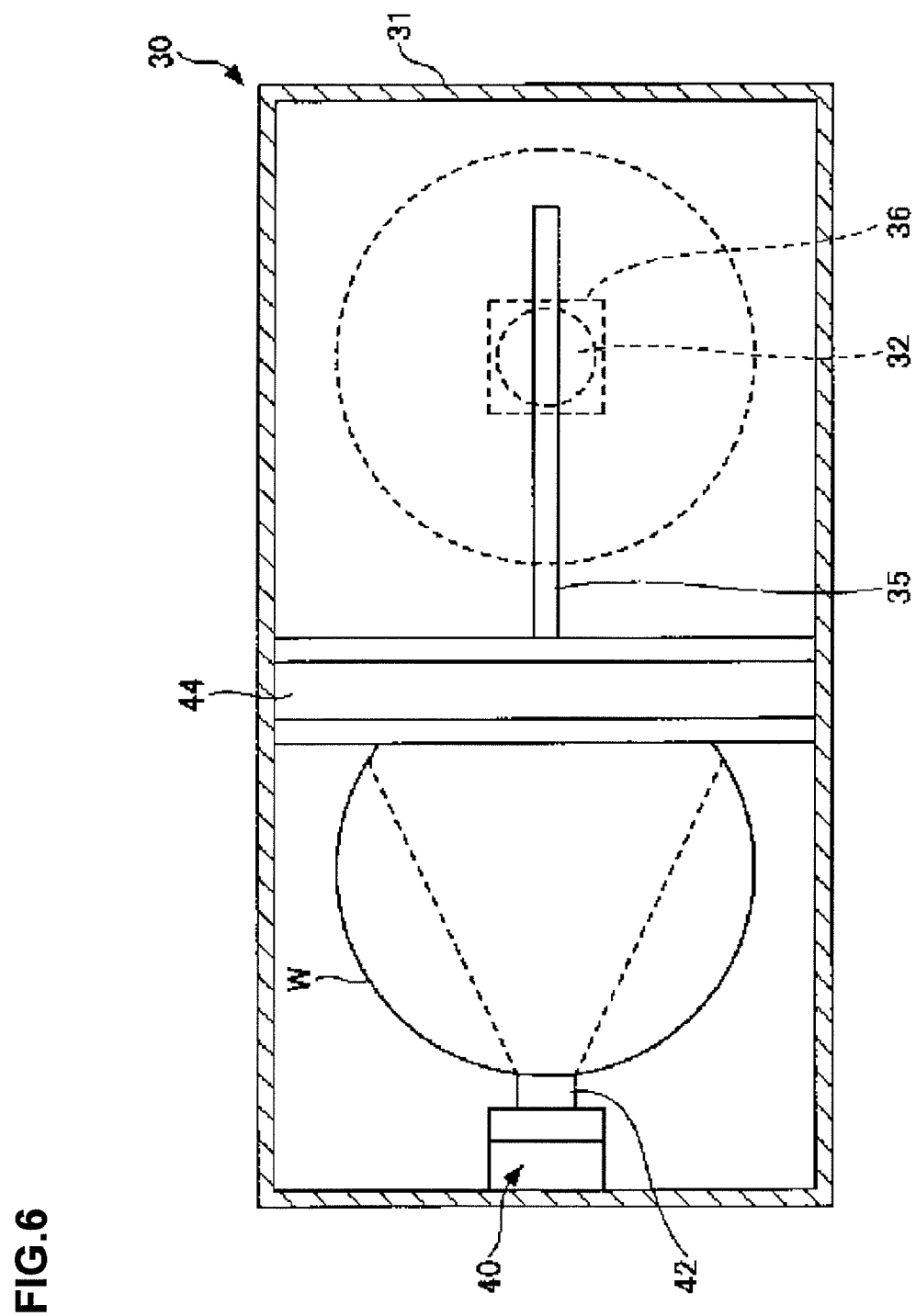
FIG. 6 is a plan view including a partial section of the substrate inspection apparatus.

Next, the substrate inspection apparatus 30 installed in the resist pattern forming apparatus will be described referring to FIG. 5 and FIG. 6. FIG. 5 is a side view including a partial section of the substrate inspection apparatus 30. FIG. 6 is a plan view including a partial section of the substrate inspection apparatus 30.

The substrate inspection apparatus 30 is for taking an image of the front surface of the wafer W on which the resist film is formed by performing processing, for example, in the modules in the third block (COT layer) B3 as described above, and for performing substrate inspection. The substrate inspection apparatus 30 only needs to be provided in any place in the resist pattern forming apparatus, and can be provided to be adjacent to each processing module, for example, in the third block (COT layer) B3 as described above.

The substrate inspection apparatus 30 has a casing 31, a mounting table 32, and an imaging unit 40.

The mounting table 32 is for mounting the wafer W thereon and provided in a lower space in the casing 31 covering the outside. The mounting table 32 freely rotates and stops by means of a rotation drive part 33 such as a motor. On one end side of the casing 31, a sensor 34 is provided which detects the position of a notch portion of the wafer W on the mounting table 32. Based on the detection result of the position of the notch portion by the sensor 34, the rotation drive part 33 rotates the mounting table 32 to be able to align the angle of the wafer W.

On the bottom surface of the casing 31, a guide rail 35 is provided which extends from one end side (the left side in FIG. 5) to the other end side (the right side in FIG. 5) of the casing 31. The mounting table 32 is provided on the guide rail 35 and can move in an X-direction along the guide rail 35, for example, by means of a driving device 36 such as a pulse motor. Driving of the mounting table 32 is performed, for example, by driving of the driving device 36 such as a pulse motor. In short, the mounting table 32 is linearly moved in the casing 31 of the substrate inspection apparatus 30 by the driving device 36.

At an end portion in the casing 31, a transfer port 39 (similar to 24 in FIG. 4) is provided through which the wafer W is transferred in and out by the fork 3A, 3B moved back and forth with respect to the mounting table 32 by the transfer arm A3.

The imaging unit 40 is provided in an upper space in the casing 31 covering the outside. The imaging unit 40 has an imaging device 42, a half mirror 43, and an illumination device 44. The imaging device 42 is fixed at one end side (the left side in FIG. 5) in the imaging unit 40. In this embodiment, a wide-angle CCD camera is used as the imaging device 42. Further, the half mirror 43 and the illumination device 44 are fixed in the vicinity of the middle in the X-direction in the casing 31. The illumination device 44 is provided behind the half mirror 43. The illumination from the illumination device 44 is applied to below the half mirror 43 passing through the half mirror 43. The reflection light from a substance existing in an application area is reflected by the half mirror 43 and captured into the imaging device 42. In other words, the imaging device 42 can image the substance existing in the application area.

According to the substrate inspection apparatus 30 having the above configuration, the imaging unit 40 fixed in the upper space in the casing 31 scans the upper surface of the wafer W on the mounting table 32 during the time when the mounting table 32 is moving in the X-direction (or a −X-direction) along the guide rail 35 in the lower space in the casing 31. Thus, the entire wafer W can be imaged.

Note that the imaging unit 40 corresponds to an image data obtaining part in the present invention.

The substrate inspection apparatus 30 includes, as a control system, a first control unit 51 controlling driving of the driving device 36, a second control unit 52 controlling imaging of the imaging device 42, and a third control unit 53 controlling the first control unit 51 and the second control unit 52.

The driving of the driving device 36, for example, ON, OFF, speed and so on are controlled by the first control unit 51. More specifically, driving, stop, and the driving speed and so on of the driving device 36 are controlled by a driving signal outputted from the first control unit 51 to the driving device 36. From the driving device 36 driven by the driving signal, an encoder signal at that time is outputted to the first control unit 51.

The imaging device 42 is controlled by the second control unit 52. In this embodiment, imaging, imaging timing, image capture time and so on are controlled by an external synchronization signal outputted from the second control unit 52 to the imaging device 42. The taken image is outputted to the second control unit 52 and subjected to later-described image processing and substrate inspection in the second control unit 52 and the third control unit 53.

The first control unit 51 and the second control unit 52 are controlled by the third control unit 53 at a higher order which controls the whole resist pattern forming apparatus. More specifically, based on the driving signal outputted from the third control unit 53 to the first control unit 51, the first control unit 51 outputs a predetermined driving signal to the driving device 36. On the other hand, the third control unit 53 outputs a driving signal also to the second control unit 52 at the same timing as that of the driving signal outputted to the first control unit 51, and the second control unit 52 outputs an external synchronization signal to the imaging device 42 based on the driving signal. In this case, the relation between the driving signal and the external synchronization signal may be the one that a synchronization signal is for performing imaging one shot (one line) to one pulse of driving signal or a synchronization signal is for performing imaging one shot (one line) to a plurality of pulses of driving signal.

The above control is performed, for example, following a computer program recorded in the third control unit 53 or a computer program recorded in various readable recording media in the third control unit 53.

In the case where the above-described image processing and substrate inspection are performed in the second control unit 52, the second control unit 52 has a filter image creating part 52a, a data creating part 52b, and a display part 52c.

The filter image creating part 52a is composed of a microprocessor (computer) and so on. The filter image creating part 52a registers obtained image data, and replaces a picture element value of any one of picture elements located on a circumference of a circle about a center position of the image of the registered image data with a maximum value of picture element values of a plurality of picture elements selected from among the picture elements located on the circumference, to thereby create a filter image for removing pseudo defects. The data creating part 52b is composed of a microprocessor (computer) and so on. The data creating part 52b performs polar coordinate transformation on position coordinates of picture elements in the image, and creates maximum value data indicating the relation between the radius of the circle about the center position of the image and the maximum value of the picture element values of all of the picture elements located on the circumference of the circle. The display part 52c is composed of a display and so on. The display part 52c displays the filter image and the maximum value data created by the filter image crating part and the data creating part.

Note that any one of the filter image creating part 52a, the data creating part 52b, and the display part 52c may be included in the third control unit 53.

When performing substrate inspection of the wafer W, the wafer W is first transferred in through the transfer port 39 by the transfer arm A3 and mounted on the mounting table 32. In this event, the mounting table 32 is previously waiting at a wafer transfer in/out position P1 (a position indicated by a dotted line in FIG. 5) on the other end side in the casing 31. Thereafter, the mounting table 32 is moved by the driving device 36 to an alignment position P2 (a position indicated by a solid line in FIG. 5) on the one end side in the casing 31 and is stopped. Then, the notch portion of the wafer W is detected by the sensor 34, the wafer W is rotated based on the position of the notch portion, and the position of the notch portion of the wafer W is adjusted to a predetermined set angle (alignment of the wafer W). The set angle in this event is previously determined, for example, according to a recipe of the wafer processing, and an angle at which an optimal image can be obtained is selected. Then, the mounting table 32 is moved by the driving device 36 at a predetermined speed to the wafer transfer in/out position P1 side, and the front surface of the wafer W is imaged by the imaging device 42 when the wafer W passes under the half mirror 43. The mounting table 32 is stopped at the wafer transfer in/out position P1 and the wafer W is then transferred out through the transfer port 39 by the transfer arm A3.

Next, a substrate inspection method and an image creation method of a filter image for substrate inspection therefor according to this embodiment will be described referring to FIG. 7 to FIG. 14.

Figure 7:
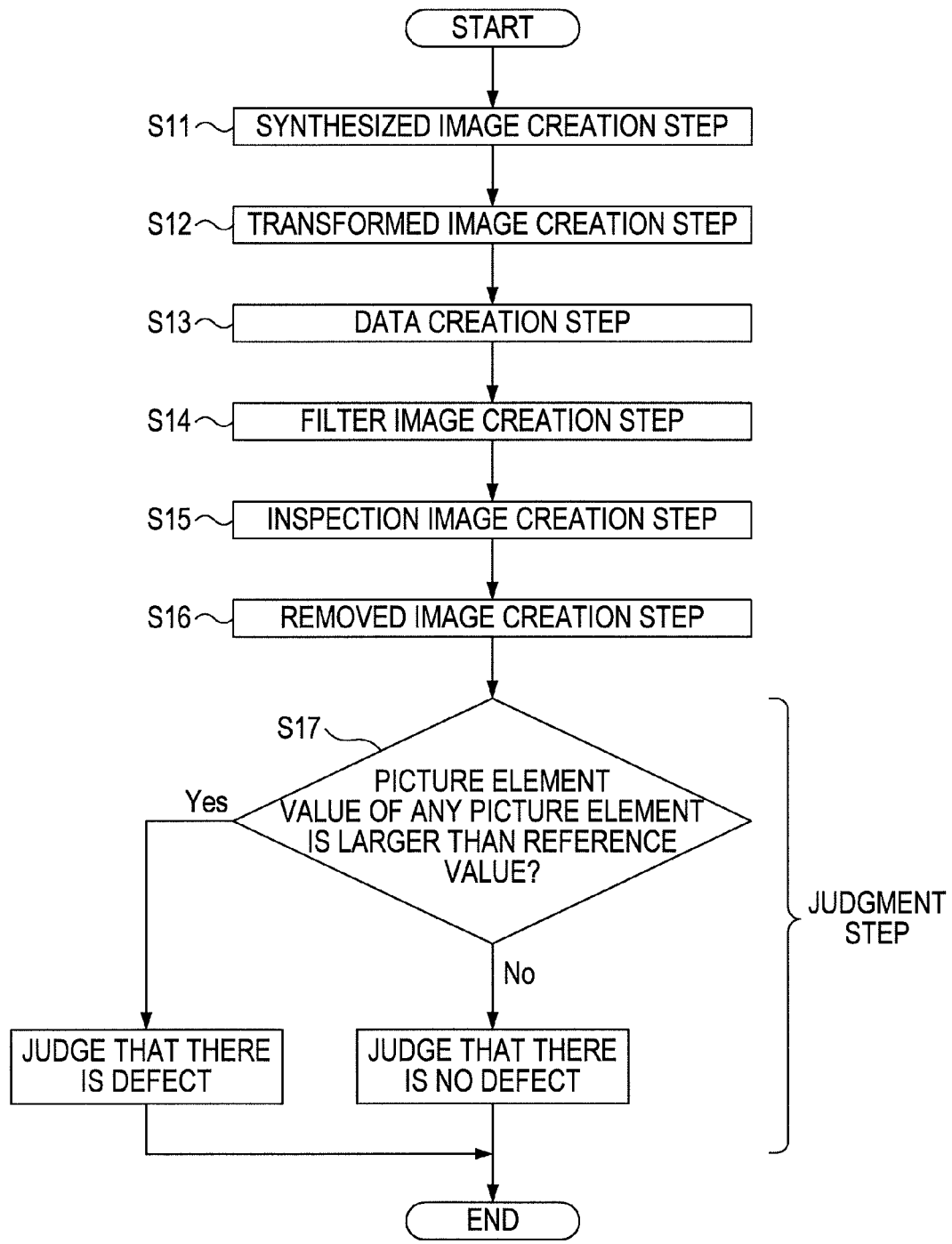
FIG. 7 is a flowchart illustrating the procedure of respective steps in a substrate inspection method and an image creation method of a filter image for substrate inspection therefor according to this embodiment.
Figure 8:
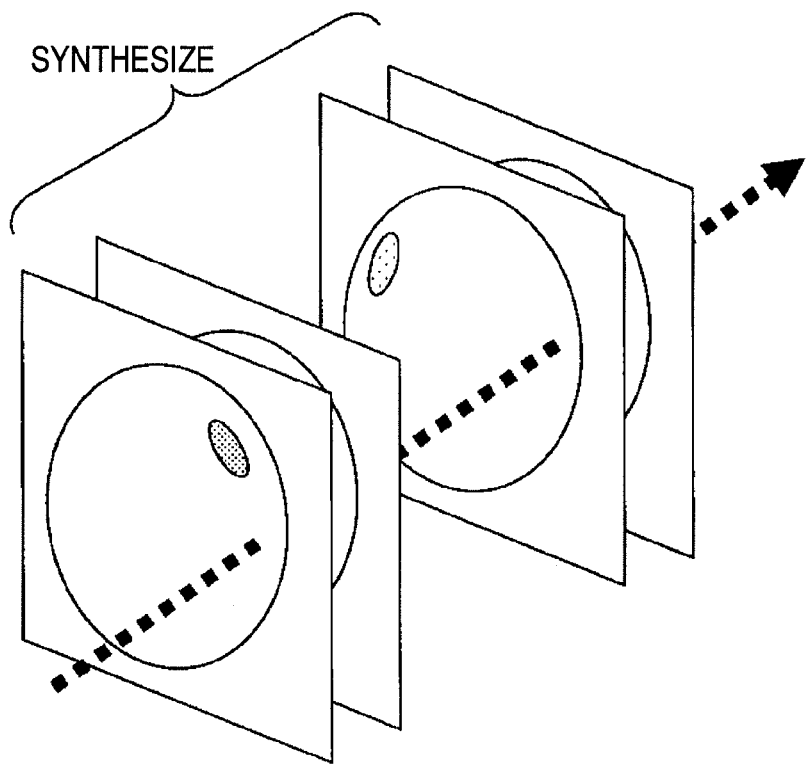
FIG. 8 is a conceptual view illustrating the appearance of creating a synthesized image by adding and synthesizing images obtained by imaging a plurality of wafers.
Figure 9:
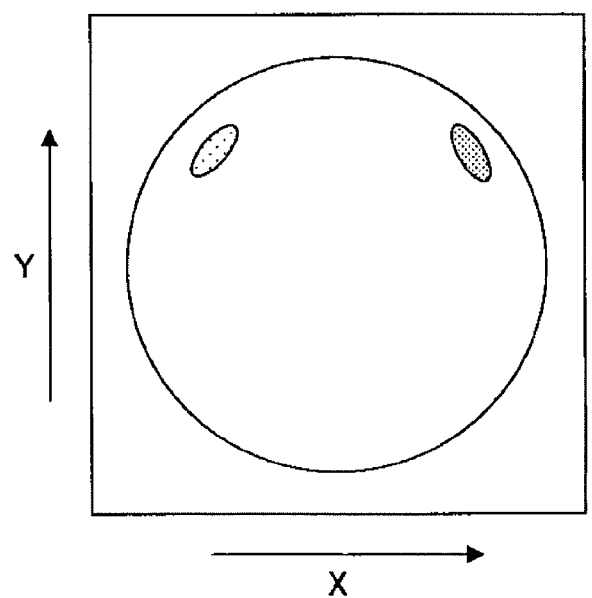
FIG. 9 is a conceptual view (1) illustrating a created synthesized image.
Figure 10:
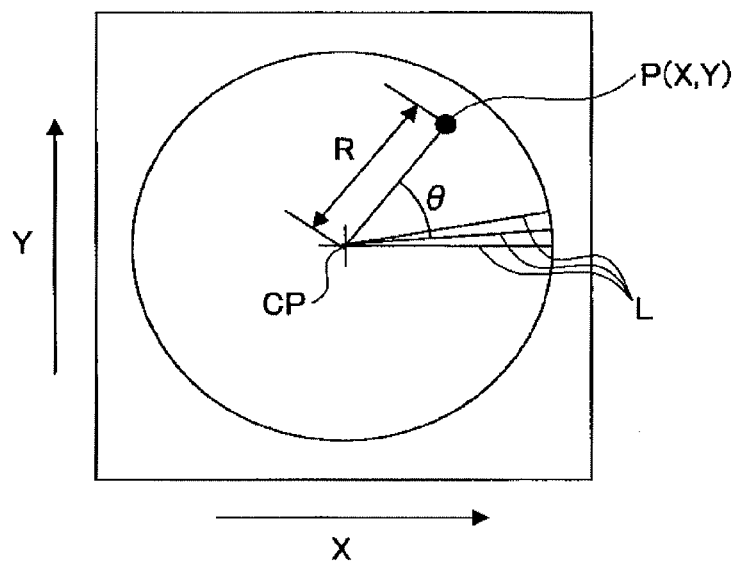
FIG. 10 is a conceptual view (2) illustrating a created synthesized image.
Figure 11:
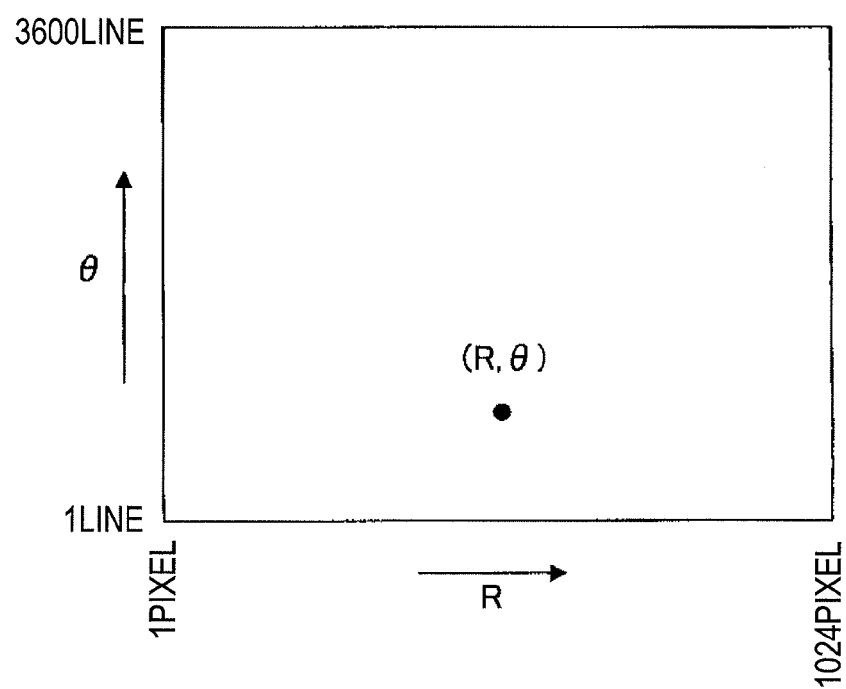
FIG. 11 is a conceptual view schematically illustrating a created transformed image.
Figure 12:
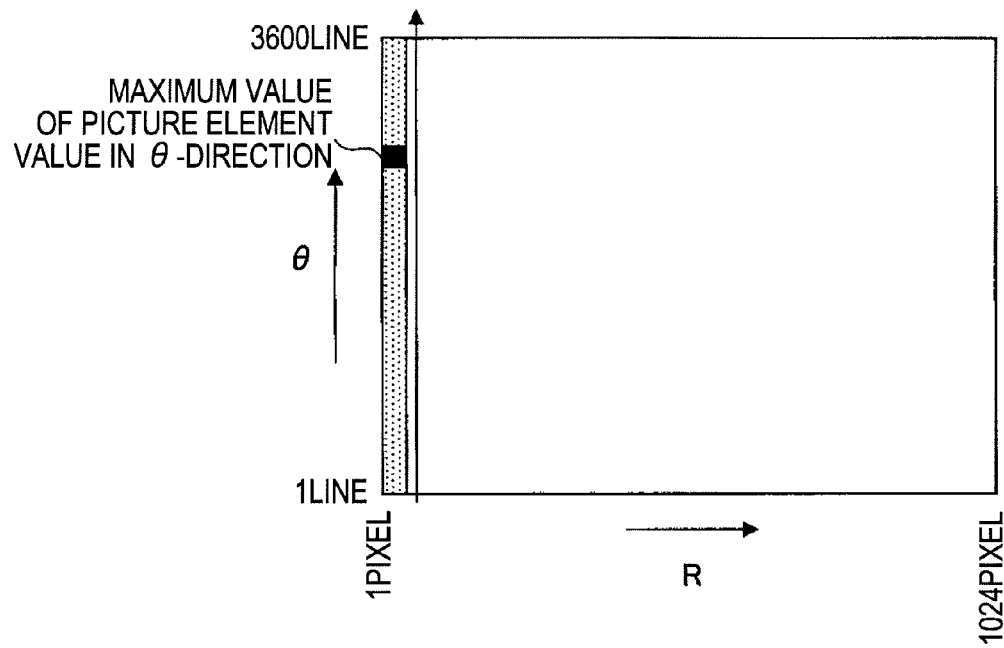
FIG. 12 is a conceptual view illustrating the appearance of creating maximum value data from the transformed image.
Figure 13:
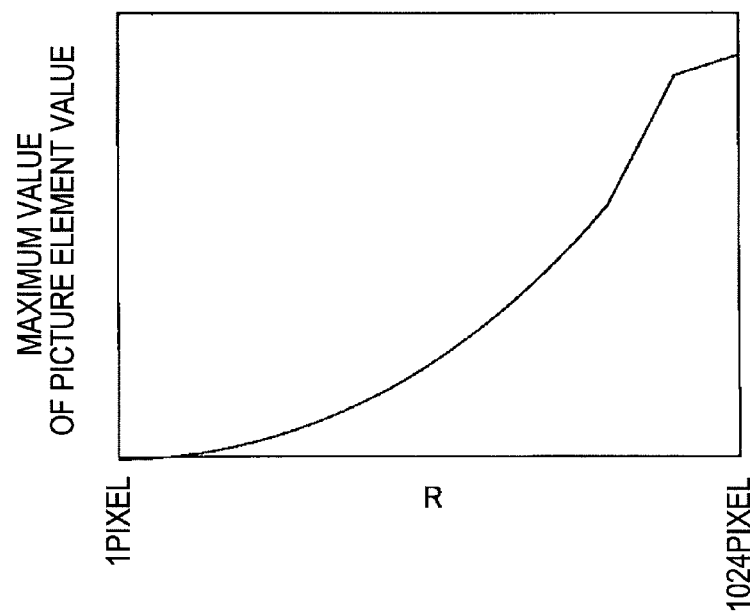
FIG. 13 is a graph schematically indicating the maximum value data.
Figure 14:
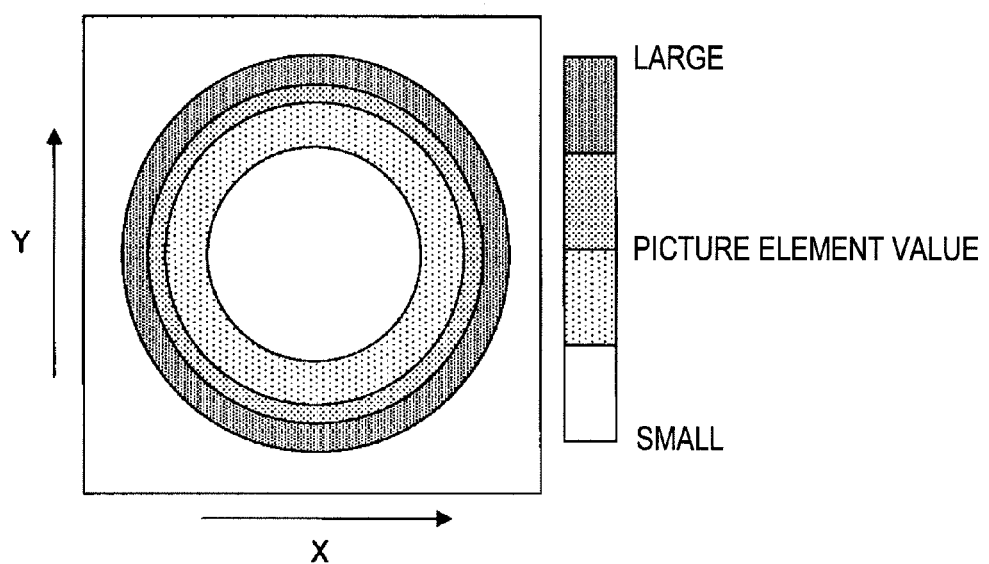
FIG. 14 is a conceptual view illustrating a created filter image.

FIG. 7 is a flowchart illustrating the procedure of respective steps in the substrate inspection method and the image creation method of a filter image for substrate inspection therefor according to this embodiment. FIG. 8 is a conceptual view illustrating the appearance of creating a synthesized image by adding and synthesizing images obtained by imaging a plurality of wafers W. FIG. 9 and FIG. 10 are conceptual views illustrating the created synthesized image. FIG. 11 is a conceptual view illustrating a created transformed image. FIG. 12 is a conceptual view illustrating the appearance of creating the maximum value data from the transformed image. FIG. 13 is a graph schematically indicating the maximum value data. FIG. 14 is a conceptual view illustrating a created filter image.

Note that Step S11 to Step S14 illustrated in FIG. 7 correspond to the image creation method in the present invention, and Step S11 to Step S17 illustrated in FIG. 7 correspond to the substrate inspection method in the present invention.

First, at Step S11, a synthesized image is created by synthesizing a plurality of images obtained by previously imaging a plurality of wafers W (synthesized image creation step).

Each of the plurality of wafers W has been imaged such that the center position of the image to be taken coincides with the center position of the wafer W. Then, as illustrated in FIG. 8, the standard deviation value of picture element values of the same picture element in the images obtained by imaging the plurality of wafers W is calculated, and the standard deviation value is newly regarded as a picture element value. For all of the picture elements, the standard deviation values are calculated and newly regarded as picture element values, thereby creating the synthesized image as illustrated in FIG. 9. Then, the created synthesized image is registered.

Further, since the center position of the previously taken image coincides with the center position of the wafer W, the center position of the synthesized image also coincides with the center position of the wafer W.

The plurality of wafers W here may be wafers which have been subjected to substrate processing using the same apparatus, for example, wafers contained in different lots which have been subjected to coating treatment using the same coating module 23. Alternatively, the plurality of wafers W may be wafers which have been subjected to substrate processing using different apparatuses, for example, wafers which have been subjected to coating treatment using different coating modules 23. When the plurality of wafers W are, for example, the wafers contained in different lots which have been subjected to coating treatment using the same coating module 23, the number of pseudo defects detected in error can be reduced in a range of processing conditions including the different lots. On the other hand, when the plurality of wafers W are the wafers which have been subjected to substrate processing using different apparatuses, for example, the wafers which have been subjected to coating treatment using different coating modules 23, the number of pseudo defects detected in error can be reduced in a range of processing conditions including the different coating modules 23.

Then, at Step S12, a transformed image is created by performing polar coordinate transformation on position coordinates of picture elements in the created synthesized image (transformed image creation step).

It is assumed that the distance of a picture element P from a center position CP of the synthesized image is R and the angle formed between the direction from the center position CP toward the picture element P and a +X-direction is θ in the synthesized image as illustrated in FIG. 10. Then, polar coordinate transformation is performed such that position coordinates (X, Y) of the picture element P in the synthesized image are transformed into polar coordinates (R, θ). Then, by displaying, using contour lines, the picture element values (luminance values) at picture element positions in two-dimensional coordinates with the horizontal axis being R and the longitudinal axis being θ, a transformed image is created as illustrated in FIG. 11.

For creating the transformed image, the luminance values for one line on the radius indicated on a straight line L in FIG. 10 are extracted from the synthesized image with the interval of θ set, for example, 0.1 degrees. The number of pixels of the luminance values for one line on the radius is, for example, 1024 pixels. This extracting operation is repeated for one circumference, that is, for 3600 lines, and the pixels included in each line are arranged in parallel to create a rectangle. Then, an image of 3600×1024 pixels as illustrated in FIG. 11 can be created.

Note that when the center position of the synthesized image coincides with the center position of the wafer W, the position of the pixel on the left end (the first pixel in each line) in the transformed image also coincides with the center position of the wafer W.

Then, at Step S13, the maximum value data is created based on the transformed image (data creation step).

As illustrated in FIG. 12, scan is performed on the transformed image in the vertical direction (an angle θ-direction) to obtain the maximum value of the luminance values of, for example, the 3600 pixels corresponding to the 3600 lines, and the maximum value is set as maximum value data. This obtaining operation is repeated in the horizontal direction (a radius R-direction), for example, for the 1024 pixels, and a graph of the maximum value data is created with the horizontal axis being the radius R and the vertical axis being the maximum value of the luminance value (the maximum value of the picture element value) as illustrated in FIG. 13. In other words, the maximum value data indicates the relation between the radius of a circle about the center position of the synthesized image and the maximum value of the picture element values of all of the picture elements located on the circumference of the circle, based on the transformed image.

Then, at Step S14, a filter image is created based on the created maximum value data (filter image creation step).

For creating the filter image, a curve of the maximum data illustrated in FIG. 13 is rotated, for example, at an interval of 0.1 degrees about a pixel column composed of pixels at the left end (the first pixels) corresponding to the center position of the synthesized image. More specifically, the curve is rotated 360 degrees, for example, at an interval of 0.1 degrees about the pixel column composed of the first pixels with the vertical axis of the maximum value data illustrated in FIG. 13 made perpendicular to an X-Y plane illustrated in FIG. 14. Then, by displaying a three-dimensional shape of a body of rotation obtained by the rotation as a two-dimensional distribution using contour lines, the filter image in a concentric form as illustrated in FIG. 14 is obtained. In short, the filter image is created by replacing the picture element values of all of the picture elements located on the circumference of a circle about the center position of the synthesized image with the maximum value determined correspondingly to the radius of the circle based on the created maximum value data.

Note that when creating the filter image, it is not always necessary to replace the picture element values of all of the picture elements located on the circumference of a circle about the center position of the synthesized image with the maximum value of the picture element values of all of the picture elements located on the circumference of the circle. It is adoptable to replace, for example, the picture element value of any one of the picture elements located on the circumference of a circle about the center position of the synthesized image with the maximum value of the picture element values of a plurality of picture elements selected from among the picture elements located on the circumference. Such an example will be described later in the second embodiment.

Then, at Step S15, an inspection image is created (inspection image creation step).

As described above, with the wafer W mounted on the mounting table 32 in the substrate inspection apparatus 30, the mounting table 32 is moved in a −X-direction, for example, from the alignment position P2 to the wafer transfer in/out position P1. Then, during the time when the mounting table 32 is moved, the imaging unit 40 scans the upper surface of the wafer W on the mounting table 32. Thus, the entire surface of the wafer W is imaged, and an inspection target image is obtained. Then, as expressed in the following Expression (1)

$$\text{Inspection image} = \text{ABS}\{(\text{inspection target image}) - (\text{reference image})\} \quad (1),$$

an inspection image is obtained by subtracting, for example, a predetermined reference image, which is obtained by imaging a normal wafer or the like, from the inspection target image. Note that ABS{ } in Expression (1) means that an absolute value of the value inside { } is taken. More specifically, the picture element value of a picture element at a certain position (a picture element A) in the inspection image is the absolute value of a value obtained by subtracting the picture element value of a picture element, in the predetermined reference image, at the same position as the picture element A from the picture element value of a picture element, in the inspection target image, at the same position as the picture element A.

Then, at Step S16, a removed image is created (removed image creation step).

As expressed in the following Expression (2)

$$\text{Removed image} = \text{inspection image} - \text{filter image} \quad (2),$$

the removed image is obtained by subtracting the filter image from the inspection image.

Then, at Step S17, by comparing the picture element value of each picture element in the removed image to a reference value, whether or not there is a defect on the substrate is judged (judgment step).

The picture element value of each picture element in the removed image is compared to a predetermined reference value, namely, a threshold value for judging the presence/absence of defect. Then, when the picture element value of any one of the picture elements in the removed image is larger than the reference value as expressed in the following expression (3), $$\text{Picture element value in removed image} - \text{reference value} > 0 \quad (3),$$

it is judged that there is a defect on the wafer W since the picture element value in the removed image exceeds the threshold value. On the other hand, when the picture element value of any one of the picture elements is equal to or smaller than the reference value as expressed in the following expression (4)

Picture element value in removed image−reference value≤0 (4), it is judged that there is no defect on the wafer W.

Figure 15A:
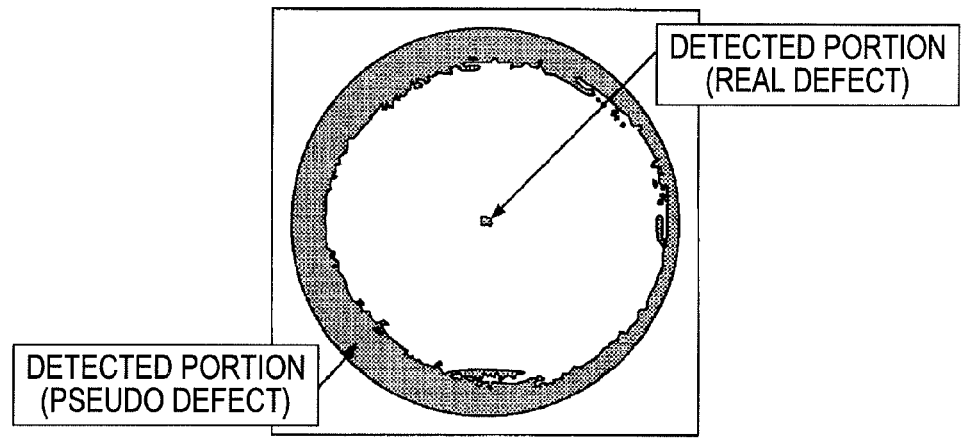
FIGS. 15A to 15C are views schematically illustrating removed images obtained by substrate inspection methods, FIG. 15A and FIG. 15B respectively illustrating removed images obtained by substrate inspection methods according to Comparative Examples 1, 2 and FIG. 15C illustrating a removed image obtained by the substrate inspection method according to the first embodiment (Example)
Figure 15B:
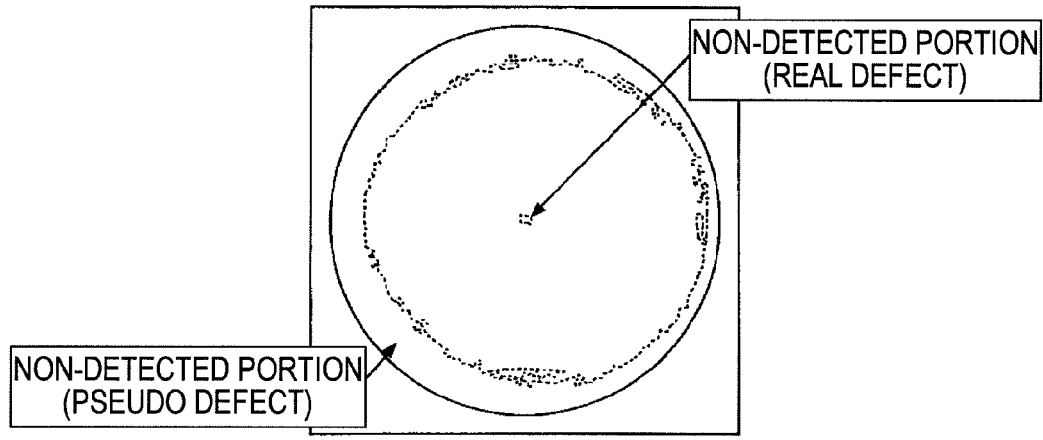
Figure 15C:
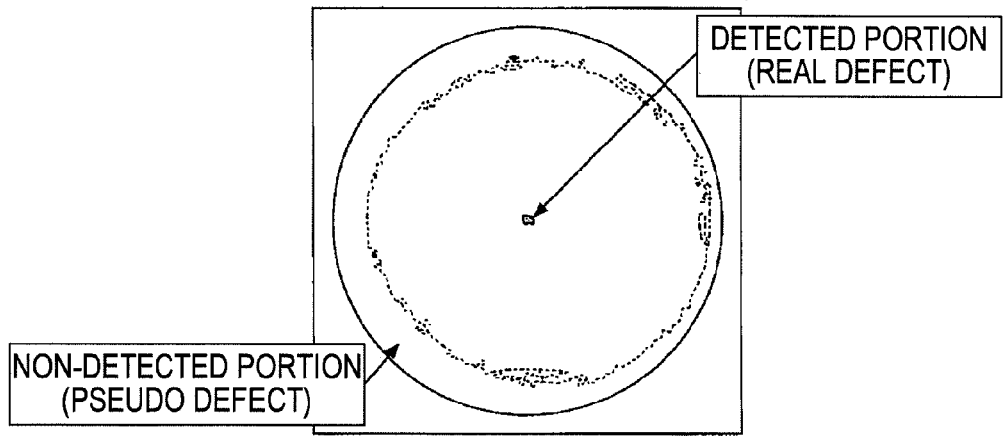

FIGS. 15A to 15C are views schematically illustrating removed images in which a removed image obtained by the substrate inspection method according to this embodiment (Example) is compared to removed images obtained by substrate inspection methods according to Comparative Examples 1, 2. FIG. 15A and FIG. 15B illustrate the removed images in Comparative Examples 1, 2 respectively, and FIG. 15C illustrates the removed image according to Example. Further, Comparative Example 1 and Comparative Example 2 illustrate examples using, as the filter image for creating the removed image, filter images having equal picture element values over the entire surface, namely, filter images when the "maximum value of the picture element value" illustrated in FIG. 13 is the same over all of the pixels on the horizontal axis R. Comparative Example 1 illustrates an example using a relatively small threshold value as the reference value, and Comparative Example 2 illustrates an example using a relatively large threshold value as the reference value.

In the examples illustrated in FIGS. 15A to 15C, it is assumed that a real defect causing a problem in manufacture of a semiconductor exists at the center portion of the wafer W and a pseudo defect causing no problem in manufacture of a semiconductor, for example, caused from coating mottle in the resist film exists at the peripheral portion of the wafer W. Thus, when the relatively small threshold value is used as the reference value (threshold value) (Comparative Example 1) as illustrated in FIG. 15A, the pseudo defect is detected in error though the rear defect is detected. Hence, when the relatively large threshold value is used as the reference value (threshold value) in order to reduce the number of pseudo defects detected in error (Comparative Example 2) as illustrated in FIG. 15B, the pseudo defect is not detected but the rear defect is not detected.

On the other hand, when using the filter image created by the procedure, for example, illustrated in Steps S11 to S14 as the filter image (Example), only the real defect can be detected without detection of the pseudo defect as illustrated in FIG. 15C. This is because the filter image in Example has a concentric distribution having picture element values larger than the picture element values when the pseudo defects are detected, and the removed image in which the pseudo defects have been removed is created at the above-described Step S16. Therefore, according to this embodiment, it is possible to reduce the number of pseudo defects detected in error and detect real defects which are supposed to be detected without decreasing the sensitivity of detecting defects.

Modification Example of First Embodiment

Next, a substrate inspection method and an image creation method of a filter image for substrate inspection therefor according to a modification example of the first embodiment of the present invention will be described referring to FIG. 16 and FIG. 17.

The substrate inspection method and the image creation method according to this modification example are different from the substrate inspection method and the image creation method according to the first embodiment in that the methods include a confirmation image creation step and a data change step after the data creation step.

A substrate inspection apparatus for performing the substrate inspection method and a resist pattern forming apparatus having the substrate inspection apparatus incorporated therein according to this modification example can be the same as the substrate inspection apparatus and the resist pattern forming apparatus described in the first embodiment, respectively. Accordingly, the description about the resist pattern forming apparatus and the substrate inspection apparatus will be omitted.

FIG. 16 is a flowchart illustrating the procedure of respective steps in the substrate inspection method and the image creation method of a filter image for substrate inspection therefor according to this modification example. FIG. 17 is a graph schematically indicating changed maximum value data.

As illustrated in FIG. 16, the substrate inspection method and the image creation method according to this modification example are the same as the substrate inspection method and the image creation method according to the first embodiment except for the confirmation image creation step and the data change step. Therefore, the description about the steps other than the confirmation image creation step and the data change step will be omitted.

In this modification example, after Step S11 (synthesized image creation step) to Step S13 (data creation step), a new wafer W is imaged and a confirmation image can be created in order to confirm whether the maximum value data may be used as it is, for example, at Step S13-2 (confirmation image creation step).

Figure 17:
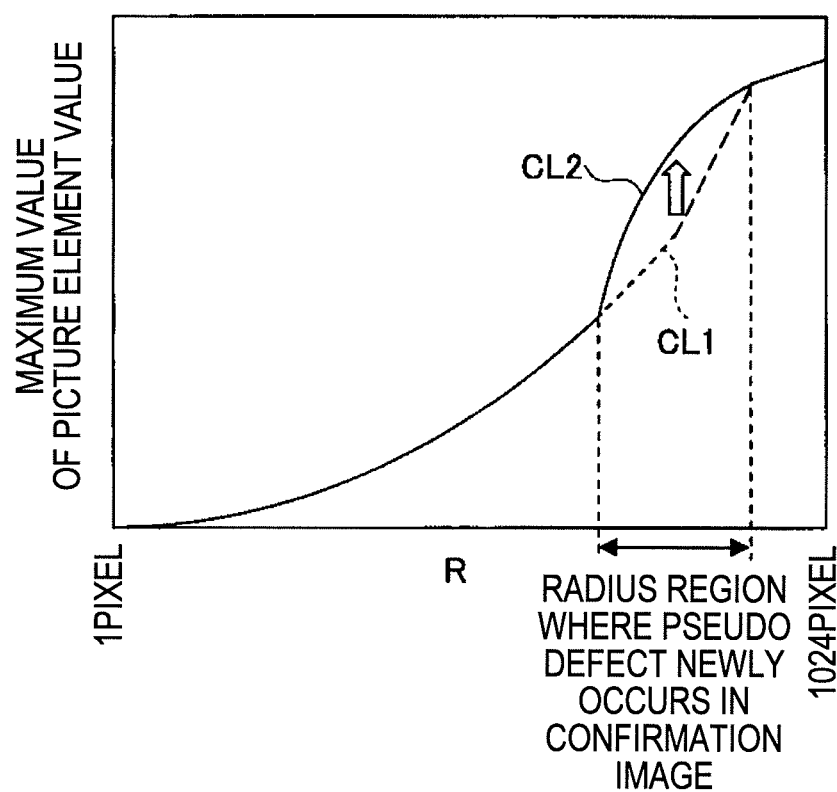
FIG. 17 is a graph schematically indicating changed maximum value data.

Subsequently, at Step S13-3, when a new pseudo defect occurs in the created confirmation image, the maximum value data is changed as illustrated in FIG. 17 so that the maximum value data is made larger in a radius area where the new pseudo defect occurs (data change step). In the example illustrated in FIG. 17, the maximum value data has been changed from a dotted line CL1 to a solid line CL2. In other words, when a pseudo defect occurs in the taken confirmation image, the maximum value data is changed so as to remove the pseudo defect.

It is also adoptable to not perform Step S13-2 (confirmation image creation step) performed, but increase the data created, for example, at Step S13 (data creation step) by a previously determined ratio at Step S13-3 (data change step).

Thereafter, Step S14 (filter image creation step) to Step S17 (judgment step) are the same as those in the first embodiment.

However, at Step S14 (filter image creation step), the filter image is created using the data created at the data change step at Step S13-3. More specifically, the filter image in this modification example is created by replacing the picture element values of all of the picture elements located on the circumference of a circle about the center position of the synthesized image with the maximum value determined corresponding to the radius of the circle based on the changed maximum value data.

According to this modification example, when the number of pseudo defects is increased due to the change of the process condition or the like after the maximum value data is created, the filter image can be created such that the increased pseudo defects are removed. Accordingly, it is possible to reduce the number of pseudo defects detected in error and detect real defects which are supposed to be detected without decreasing the sensitivity of detecting defects.

Second Embodiment

Next, a substrate inspection method and an image creation method of a filter image for substrate inspection therefor according to a second embodiment of the present invention will be described referring to FIG. 18 to FIG. 21.

The substrate inspection method and the image creation method according to this embodiment are different from the substrate inspection method and the image creation method according to the first embodiment in that the methods according to this embodiment include a rotated image creation step in place of the data creation step and do not include the transformed image creation step.

A substrate inspection apparatus for performing the substrate inspection method and a resist pattern forming apparatus having the substrate inspection apparatus incorporated therein according to this embodiment can be the same as the substrate inspection apparatus and the resist pattern forming apparatus described in the first embodiment, respectively. Accordingly, the description about the resist pattern forming apparatus and the substrate inspection apparatus will be omitted.

Figure 18:
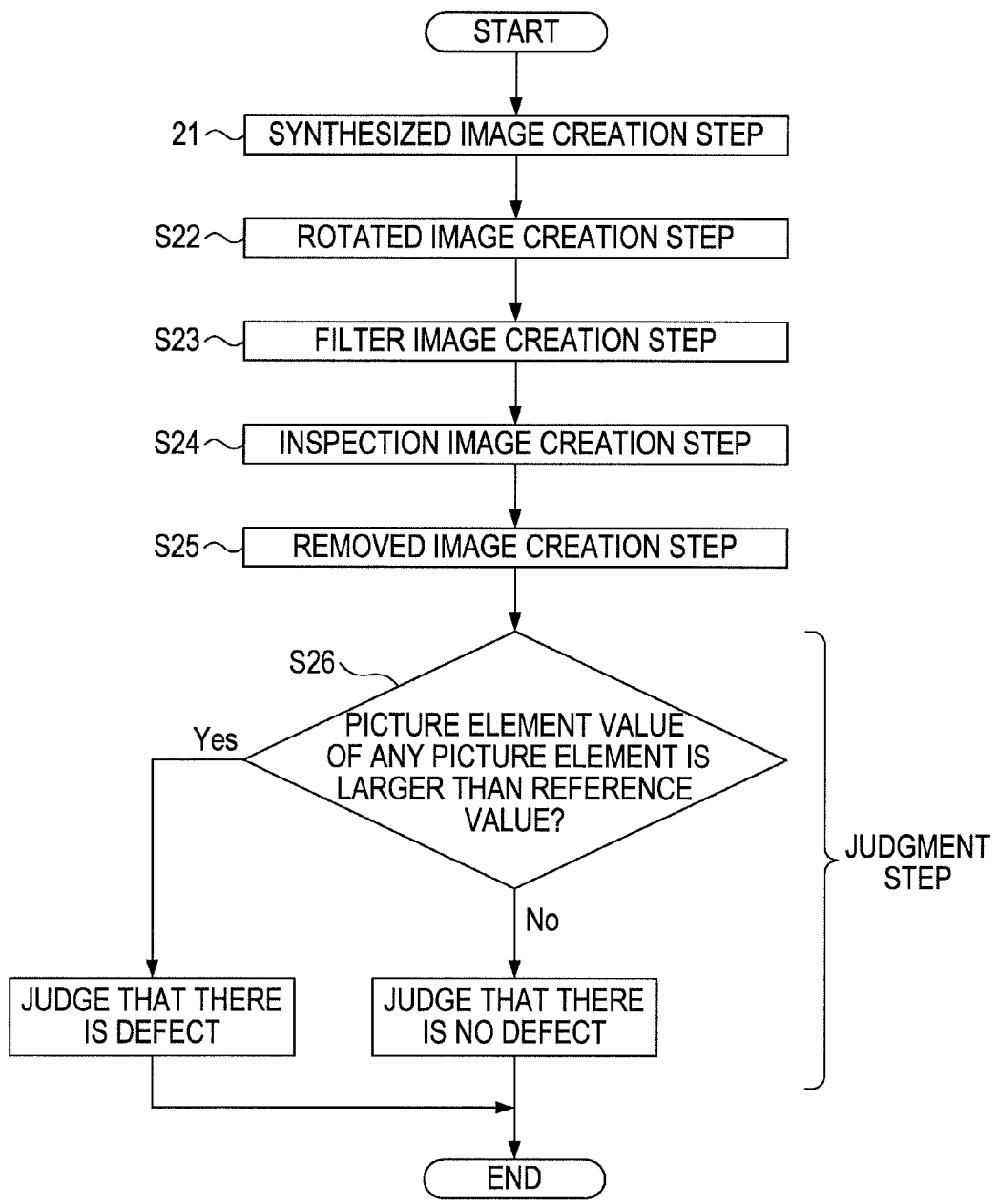
FIG. 18 is a flowchart illustrating the procedure of respective steps in the substrate inspection method and the image creation method of a filter image for substrate inspection therefor according to a second embodiment.
Figure 19:
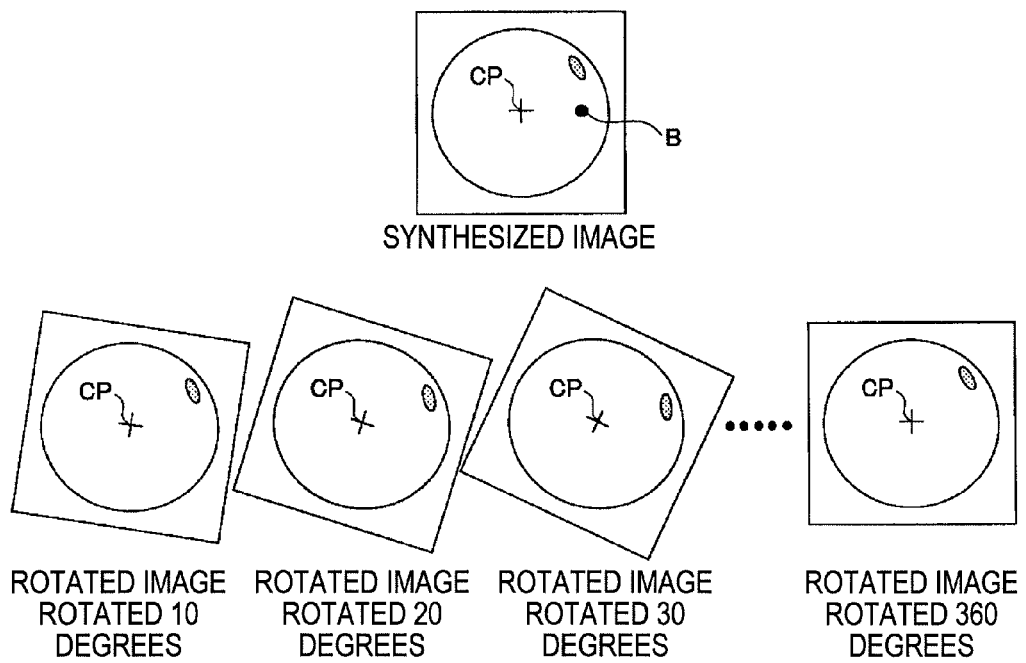
FIG. 19 is a conceptual view illustrating 36 rotated images.
Figure 20:
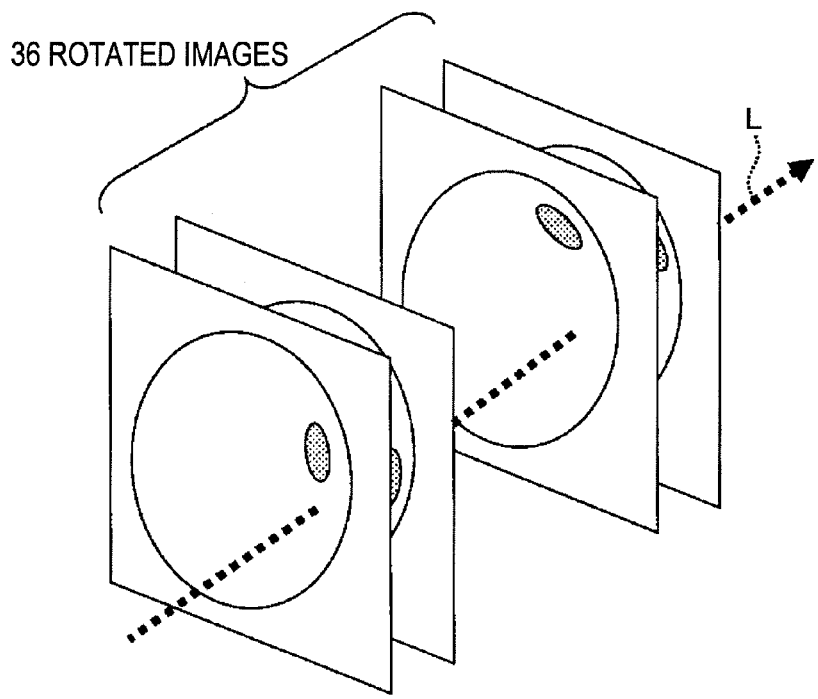
FIG. 20 is a conceptual view illustrating the appearance of creating a filter image based on the 36 rotated images.
Figure 21:
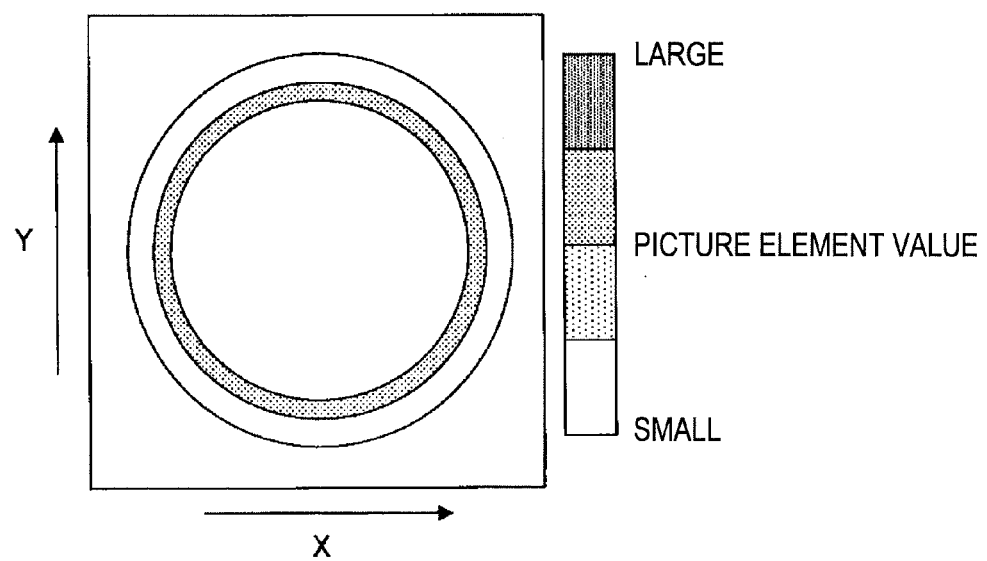
FIG. 21 is a conceptual view illustrating the created filter image.

FIG. 18 is a flowchart illustrating the procedure of respective steps in the substrate inspection method and the image creation method of a filter image for substrate inspection therefor according to this embodiment. FIG. 19 is a conceptual view illustrating 36 rotated images. FIG. 20 is a conceptual view illustrating the appearance of creating a filter image based on the 36 rotated images. FIG. 21 is a conceptual view illustrating the created filter image.

Step S21 (synthesized image creation step), and Step S24 (inspection image creation step) to Step S26 (judgment step) in this embodiment are the same as Step S11 (synthesized image creation step), and Step S15 (inspection image creation step) to Step S17 (judgment step) in the first embodiment respectively, and the description thereof will be omitted.

In this embodiment, after Step S21 (synthesized image creation step), rotated images are created at Step S22 (rotated image creation step). As illustrated in FIG. 19, 36 rotated images obtained by rotating the synthesized image 10 degrees (°), 20°, 30°, . . . , 360° about a center position CP of the synthesized image are created.

Then, at Step S23, a filter image is created (filter image creation step). In FIG. 20, a line linking picture elements, in the 36 rotated images, at the same position as a picture element B in the synthesized image illustrated in FIG. 19 is indicated by a dotted line L. Then, the 36 rotated images are compared to one another, the picture element value of the rotated image which is maximum among the picture element values of the picture elements located on the dotted line L is extracted, and the picture element value of the picture element B in the synthesized image is replaced with the extracted picture element value. This operation is repeated for all of the picture elements in the synthesized image to create the filter image as illustrated in FIG. 21. In other words, the filter image is created by replacing the picture element value of the picture element B in the synthesized image with the maximum value of the picture element values of the picture elements, in the 36 rotated images of the synthesized image, at the same position as the picture element B. This is replacement of the picture element value of any one of the picture elements located on the circumference of a circle about the center position of the synthesized image with the maximum value of the picture element values of a plurality of picture elements selected from among the picture elements located on the circumference so that their center angles are at 10° intervals.

Note that though the example that the synthesized image is rotated 10°, 20°, 30°, . . . , 360° about the center position of the synthesized image is illustrated at Step S22 (rotated image creation step), n rotated images obtained by rotating the synthesized image by (360/n)° each, where n is a natural number equal to or larger than 2 may be created until the synthesized image is rotated 360°. Then, at Step S23 (filter image creation step), the filter image may be created by replacing the picture element value of one picture element in the synthesized image with the maximum value of the picture element values of picture elements, in the n rotated images, at the same position as the one picture element.

Note that n is preferably a natural number equal to or larger than 30. This can make the filter image almost concentric.

Thereafter, Step S24 (inspection image creation step) to Step S26 (judgment step) are the same as those in the first embodiment.

Also in this embodiment, the filter image has an almost concentric distribution having picture element values larger than the picture element values when the pseudo defects are detected, and the removed image in which the pseudo defects have been removed is created. Accordingly, it is possible to reduce the number of pseudo defects detected in error and detect real defects which are supposed to be detected without decreasing the sensitivity of detecting defects.

Note that the substrate inspection method and the image creation method according to this embodiment may include Step S13 (data creation step) to Step S13-3 (data change step) which have been described in the modification example of the first embodiment, after Step S22 (rotated image creation step) and before Step S23 (filter image creation step). More specifically, the maximum value data indicating the relation between the radius of a circle about the center position in the image of the image data and the maximum value of the picture element values of all of the picture elements located on the circumference of the circle, is created using the rotated images created at Step S22 (rotated image creation step) as registered image data. Thereafter, the created maximum value data is changed based on the image obtained by imaging the wafer W. Thus, as in the modification example of the first embodiment, the filter image can be created such that the increased pseudo defects due to the change of the process condition or the like after the creation of the maximum value data are removed. Accordingly, it is possible to reduce the number of pseudo defects detected in error and detect real defects which are supposed to be detected without decreasing the sensitivity of detecting defects.

Though preferred embodiments of the present invention have been described above, the present invention is not limited to the specific embodiments but can be variously changed and modified within the scope of the present invention as set forth in claims.

Though a synthesized image is created from images obtained by imaging a plurality of wafers W and then a filter image is created in the above embodiments, the filter image may be created from the image of one wafer W without creating the synthesized image. In this case, one of registered images of the wafers W is selected, and a transformed image or a rotated image thereof is created, and then the filter image may be created.

What is claimed is:

1. An image creation method of creating a filter image for removing a pseudo defect to inspect presence/absence of a defect on a substrate, said method comprising:
    a filter image creation step of creating the filter image by replacing a picture element value of any one of picture elements located on a circumference of a circle about a center position of a registered image with a maximum value of picture element values of a plurality of picture elements selected from among the picture elements located on the circumference;
    a transformed image creation step of creating a transformed image by performing polar coordinate transformation on position coordinates of picture elements in the registered image; and a data creation step of creating maximum value data indicating a relation between a radius of the circle about the center position and a maximum value of picture element values of all of the picture elements located on the circumference of the circle, based on the created transformed image, wherein said filter image creation step creates the filter image by replacing the picture element values of all of the picture elements located on the circumference of the circle about the center position with a maximum value determined corresponding to the radius of the circle, based on the created maximum value data.

2. The image creation method as set forth in claim 1, further comprising:

after said data creation step, a data change step of changing the created maximum value data based on an image obtained by imaging the substrate, wherein said filter image creation step creates the filter image by replacing the picture element values of all of the picture elements located on the circumference of the circle about the center position with the maximum value determined corresponding to the radius of the circle, based on the changed maximum value data.

3. The image creation method as set forth in claim 2, wherein said data change step changes the maximum value data, when a pseudo defect occurs in the taken image, to remove the pseudo defect.

4. An image creation method of creating a filter image for removing a pseudo defect to inspect presence/absence of a defect on a substrate, said method comprising:

a filter image creation step of creating the filter image by replacing a picture element value of any one of picture elements located on a circumference of a circle about a center position of a registered image with a maximum value of picture element values of a plurality of picture elements selected from front among the picture elements located on the circumference; and a rotated image creation step of creating n rotated images obtained by rotating the registered image 360/n degrees (n being a natural number equal to or larger than 2) each about the center position of the image, wherein said filter image creation step creates the filter image by replacing a picture element value of one picture element in the image with a maximum value of picture element values of picture elements, in the n rotated images, at a same position as the one picture element.

5. An image creation method of creating a filter image for removing a pseudo defect to inspect presence/absence of a defect on a substrate, said method comprising:

a filter image creation step of creating the filter image by replacing a picture element value of any one of picture elements located on a circumference of a circle about a center position of a registered image with a maximum value of picture element values of a plurality of picture elements selected from among the picture elements located on the circumference; and a synthesized image creation step of creating a synthesized image by synthesizing images obtained by previously imaging a plurality of substrates, wherein the registered image is the synthesized image created by said synthesized image creation step.

6. A non-transitory computer-readable recording medium having a program recorded thereon for causing a computer to perform the image creation method of claim 5.

7. A non-transitory computer-readable recording medium having a program recorded thereon for causing a computer to perform an image creation method of creating a filter image for removing a pseudo defect to inspect presence/absence of a defect on a substrate, said image creation method comprising:

a filter image creation step of creating the filter image by replacing a picture element value of any one of picture elements located on a circumference of a circle about a center position of a registered image with a maximum value of picture element values of a plurality of picture elements selected from among the picture elements located on the circumference;

a transformed image creation step of creating a transformed image by performing polar coordinate transformation on position coordinates of picture elements in the registered image; and a data creation step of creating maximum value data indicating a relation between a radius of the circle about the center position and a maximum value of picture element values of all of the picture elements located on the circumference of the circle, based on the created transformed image, wherein said filter image creation step creates the filter image by replacing the picture element values of all of the picture elements located on the circumference of the circle about the center position with a maximum value determined corresponding to the radius of the circle, based on the created maximum value data.

8. The non-transitory computer-readable recording medium as set forth in claim 7, further comprising:

after said data creation step, a data change step of changing the created maximum value data based on an image obtained by imaging the substrate, wherein said filter image creation step creates the filter image by replacing the picture element values of all of the picture elements located on the circumference of the circle about the center position with the maximum value determined corresponding to the radius of the circle, based on the changed maximum value data.

9. The non-transitory computer-readable recording medium as set forth in claim 8, wherein said data change step changes the maximum value data, when a pseudo defect occurs in the taken image, to remove the pseudo defect.

10. The non-transitory computer-readable recording medium of claim 8, the program recorded thereon further comprising:

a synthesized image creation step of creating a synthesized image by synthesizing images obtained by previously imaging a plurality of substrates, wherein the registered image is the synthesized image created by said synthesized image creation step.

11. The non-transitory computer-readable recording medium of claim 10, the program recorded thereon further comprising:

a rotated image creation step of creating n rotated images obtained by rotating the registered image 360/n degrees (n being a natural number equal to or larger than 2) each about the center position of the image, wherein said filter image creation step creates the filter image by replacing a picture element value of one picture element in the image with a maximum value of picture element values of picture elements, in the n rotated images, at a same position as the one picture element.

12. A non-transitory computer-readable recording medium having a program recorded thereon for causing a computer to perform an image creation method of creating a filter image for removing a pseudo defect to inspect presence/absence of a defect on a substrate, said image creation method comprising:

a filter image creation step of creating the filter image by replacing a picture element value of any one of picture elements located on a circumference of a circle about a center position of a registered image with a maximum value of picture element values of a plurality of picture elements selected from among the picture elements located on the circumference; and a rotated image creation step of creating n rotated images obtained by rotating the registered image 360/n degrees (n being a natural number equal to or larger than 2) each about the center position of the image, wherein said filter image creation step creates the filter image by replacing a picture element value of one picture element in the image with a maximum value of picture element values of picture elements, in the n rotated images, at a same position as the one picture element.

* * * * *